(12) United States Patent
Kobayashi et al.

(10) Patent No.: US 9,966,621 B2
(45) Date of Patent: May 8, 2018

(54) FUEL CELL SYSTEM

(71) Applicant: PANASONIC CORPORATION, Osaka (JP)

(72) Inventors: Susumu Kobayashi, Nara (JP); Kunihiro Ukai, Nara (JP); Yuuichi Yakumaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 334 days.

(21) Appl. No.: 14/387,419

(22) PCT Filed: Jan. 14, 2014

(86) PCT No.: PCT/JP2014/000121
§ 371 (c)(1),
(2) Date: Sep. 23, 2014

(87) PCT Pub. No.: WO2014/115502
PCT Pub. Date: Jul. 31, 2014

(65) Prior Publication Data
US 2015/0030943 A1 Jan. 29, 2015

(30) Foreign Application Priority Data
Jan. 24, 2013 (JP) ................. 2013-011077

(51) Int. Cl.
*C01B 3/38* (2006.01)
*H01M 8/06* (2016.01)
(Continued)

(52) U.S. Cl.
CPC ............. *H01M 8/0675* (2013.01); *C01B 3/38* (2013.01); *H01M 8/04014* (2013.01);
(Continued)

(58) Field of Classification Search
CPC ................................. H01M 8/04738
See application file for complete search history.

(56) References Cited

U.S. PATENT DOCUMENTS

| 3,655,448 A | 4/1972 | Setzer | |
|---|---|---|---|
| 5,932,181 A * | 8/1999 | Kim | ................. B01D 53/48 422/187 |

(Continued)

FOREIGN PATENT DOCUMENTS

| JP | 10-265201 A | 10/1998 |
|---|---|---|
| JP | 2001-202982 A | 7/2001 |

(Continued)

OTHER PUBLICATIONS

TranslationOfJP2002179406.*

(Continued)

*Primary Examiner* — Sarah A. Slifka
*Assistant Examiner* — Brian R Ohara
(74) *Attorney, Agent, or Firm* — McDermott Will & Emery LLP

(57) ABSTRACT

A fuel cell system includes: a reformer to generate a fuel gas from a raw material gas, reforming water, and air supplied to the reformer; an SOFC to generate electric power through a power-generating reaction by utilizing the fuel gas and air; a combustor to combust an anode off gas discharged from the SOFC; a hot module housing the reformer, the SOFC, and the combustor, which are covered with a heat insulating material; and a hydrodesulfurizer to remove a sulfur component from the raw material gas by hydrodesulfurization. The anode off gas is supplied to the combustor and the hydrodesulfurizer in a distributed manner. The hydrodesulfurizer performs the hydrodesulfurization of the raw material gas by utilizing the anode off gas as a hydrogen source and utilizing an exhaust gas discharged from the hot module (Continued)

as a heat source, the exhaust gas containing at least combustion heat from the combustor.

5 Claims, 8 Drawing Sheets

(51) Int. Cl.
      *H01M 8/04*    (2016.01)
      *H01M 8/24*    (2016.01)
      *H01M 8/0662*    (2016.01)
      *H01M 8/0612*    (2016.01)
      *H01M 8/2475*    (2016.01)
      *H01M 8/04014*    (2016.01)
      *H01M 8/04089*    (2016.01)
      *H01M 8/0432*    (2016.01)
      *H01M 8/04746*    (2016.01)
      *H01M 8/04701*    (2016.01)
      *H01M 8/124*    (2016.01)

(52) U.S. Cl.
    CPC ..... *H01M 8/04022* (2013.01); *H01M 8/0432* (2013.01); *H01M 8/04089* (2013.01); *H01M 8/04365* (2013.01); *H01M 8/04373* (2013.01); *H01M 8/04738* (2013.01); *H01M 8/04753* (2013.01); *H01M 8/04776* (2013.01); *H01M 8/0618* (2013.01); *H01M 8/2475* (2013.01); *C01B 2203/066* (2013.01); *C01B 2203/1047* (2013.01); *C01B 2203/127* (2013.01); *C01B 2203/16* (2013.01); *C01B 2203/1614* (2013.01); *H01M 2008/1293* (2013.01); *H01M 2250/20* (2013.01); *Y02E 60/525* (2013.01); *Y02T 90/32* (2013.01)

(56) References Cited

U.S. PATENT DOCUMENTS

| | | | | |
|---|---|---|---|---|
| 6,316,134 | B1* | 11/2001 | Cownden | ................ B01B 1/005 429/410 |
| 2004/0013586 | A1* | 1/2004 | Oh | ........................ B01J 19/249 422/601 |
| 2004/0131540 | A1* | 7/2004 | Fujii | ................... H01M 8/0612 423/650 |
| 2007/0092766 | A1 | 4/2007 | England et al. | |
| 2008/0070078 | A1* | 3/2008 | Gummalla | ............. B64D 41/00 429/410 |
| 2009/0087705 | A1 | 4/2009 | Fuju et al. | |
| 2009/0280364 | A1* | 11/2009 | Tsunoda | ............ H01M 8/04022 429/454 |
| 2010/0227233 | A1* | 9/2010 | Yamamoto | ........ H01M 8/04007 429/423 |
| 2012/0178006 | A1* | 7/2012 | Kani | ....................... C01B 3/384 429/423 |

FOREIGN PATENT DOCUMENTS

| | | | |
|---|---|---|---|
| JP | 2002179406 | A * | 6/2002 |
| JP | 2003-132926 | A | 5/2003 |
| JP | 2005-089255 | A | 4/2005 |
| JP | 2008-016340 | A | 1/2008 |
| JP | 2009-076274 | A | 4/2009 |
| JP | 2009-249203 | A | 10/2009 |
| JP | 2010-160929 | A | 7/2010 |
| JP | 2010-195623 | A | 9/2010 |
| JP | 2010-257656 | A | 11/2010 |
| JP | 2011-216308 | A | 10/2011 |
| JP | 2012-020898 | A | 2/2012 |
| JP | 2013-184844 | A | 9/2013 |

OTHER PUBLICATIONS

International Search Report issued in PCT/JP2014/000121, dated Feb. 25, 2014, with English translation.

Japanese Office Action issued in Japanese Application No. 2014-526022, dated Mar. 17, 2015.

Extended European Search Report issued in Application No. 14742975.7 dated Oct. 29, 2015.

* cited by examiner

FUEL CELL SYSTEM

RELATED APPLICATIONS

This application is the U.S. National Phase under 35 U.S.C. § 371 of International Application No. PCT/JP2014/000121, filed on Jan. 14, 2014, which in turn claims the benefit of Japanese Application No. 2013-011077, filed on Jan. 24, 2013, the disclosures of which Applications are incorporated by reference herein.

TECHNICAL FIELD

The present invention relates to fuel cell systems including a desulfurizer configured to remove sulfur components from a raw material gas (raw fuel gas) containing a hydrocarbon.

BACKGROUND ART

In order to accelerate the spread of solid oxide fuel cell systems (hereinafter, SOFC systems) as stationary power generating units, it is necessary that the utilization of solid oxide fuel cell systems provide a greater advantage than the utilization of conventional grid power supplied from a large-scale power station via a power grid. Therefore, development has been conducted with an objective of realizing high power generation efficiency, longer life, or lower costs of SOFC systems.

For example, in an SOFC system using a hydrocarbon as a raw material gas, steam reforming using steam is utilized in order to reform the raw material gas. Steam reforming (SR) is a reforming method with the highest efficiency, and realizes a long system life of tens of thousands of hours. Therefore, steam reforming is the most preferred reforming method in order to achieve the aforementioned objective.

In an SOFC system, similar to PEFC (Polymer Electrolyte Fuel Cell), PAFC (Phosphoric Acid Fuel Cell), etc., energy necessary for performing the steam reforming is obtained from combustion heat, which is generated as a result of combusting an exhaust hydrogen gas discharged from the fuel cell (hereinafter, the exhaust hydrogen gas is referred to as an anode off gas). A particularly characteristic feature of such a high-temperature fuel cell as a solid oxide fuel cell (hereinafter, SOFC) is that the cell operating temperature of the high-temperature fuel cell (about 700 to 1000° C.) is higher than a temperature necessary for the steam reforming (about 600 to 700° C.).

In an SOFC system, even exhaust heat generated from an exothermic cell reaction can be used as the energy necessary for the steam reforming, and a kind of energy regeneration circuit can be formed between the fuel cell and a reformer. Therefore, the energy efficiency of such SOFC systems is higher than that of other fuel cell systems such as PEFC and PAFC. That is, SOFC systems have a feature of being excellent in terms of power generation efficiency.

In particular, in order to realize more excellent power generation efficiency, SOFC systems adopt a heat insulating structure that is formed by integrating an SOFC, a reformer, a combustor, and the like together. Specifically, SOFC systems include a hot module (a casing part). The hot module houses, at least, an SOFC, a reformer, a combustor, and the like, which are covered with a heat insulating material.

In order to perform the above-described steam reforming, the reformer is packed with a catalyst (a reforming catalyst). It is known that if the catalyst is poisoned by sulfur components contained in the raw material gas, it causes degradation in catalytic activity. For this reason, it is necessary to desulfurize the raw material gas before the raw material is supplied to the reformer.

One example of a method of desulfurizing the raw material gas is a hydrodesulfurization method in which: sulfur components contained in a fuel gas are reduced by hydrogen, so that hydrogen sulfide is generated; and thereafter, the hydrogen sulfide is adsorbed, and thus the fuel gas is desulfurized. The hydrodesulfurization method has excellent features of being effective against a wide range of sulfur components and being applicable to even a high sulfur concentration. For example, Patent Literature 1 proposes a SOFC system of a hot module type, which adopts such a hydrodesulfurization method.

CITATION LIST

Patent Literature

PTL 1: Japanese Laid-Open Patent Application Publication No. 2011-216308

SUMMARY OF INVENTION

Technical Problem

However, the SOFC system disclosed in Patent Literature 1 has a problem in that if the composition of the raw material gas changes, then stable operation of a hydrodesulfurizer cannot be realized.

The present invention has been made in view of the above-described problems. An object of the present invention is to provide a fuel cell system that allows a hydrodesulfurizer to operate stably even if the composition of a raw material gas changes.

Solution to Problem

In order to solve the above-described problems, a fuel cell system according to the present invention includes: a reformer configured to generate a reformed gas from a raw material gas, water, and air that are supplied to the reformer, the reformed gas serving as a fuel gas; a fuel cell configured to generate electric power through a power-generating reaction by utilizing the fuel gas and air; a combustor configured to combust an anode off gas, the anode off gas being the fuel gas that has not been utilized in the fuel cell; a casing part housing at least the reformer, the fuel cell, and the combustor, which are covered with a heat insulating material; and a desulfurizer configured to remove a sulfur component from the raw material gas supplied thereto by hydrodesulfurization. The anode off gas is supplied to the combustor and the desulfurizer in a distributed manner, and the desulfurizer performs the hydrodesulfurization of the raw material gas by utilizing the supplied anode off gas as a hydrogen source and utilizing an exhaust gas discharged from the casing part as a heat source, the exhaust gas containing at least combustion heat from the combustor.

In order to solve the above-described problems, another fuel cell system according to the present invention includes:

a reformer configured to generate a reformed gas from a raw material gas and water that are supplied to the reformer, the reformed gas serving as a fuel gas; a fuel cell configured to generate electric power through a power-generating reaction by utilizing the fuel gas and air; a combustor configured to combust an anode off gas, the anode off gas being the fuel gas that has not been utilized in the fuel cell; a casing part housing at least the reformer, the fuel cell, and the combustor, which are covered with a heat insulating material; and a desulfurizer configured to remove a sulfur component from the raw material gas supplied thereto by hydrodesulfurization. The anode off gas is supplied to the combustor and the desulfurizer in a distributed manner, and the desulfurizer performs the hydrodesulfurization of the raw material gas by utilizing the supplied anode off gas as a hydrogen source and utilizing an exhaust gas discharged from the casing part as a heat source, the exhaust gas containing at least combustion heat from the combustor.

Advantageous Effects of Invention

The fuel cell systems according to the present invention are configured as described above, and provide an advantageous effect of allowing a hydrodesulfurizer to operate stably even if the composition of the raw material gas has changed.

DESCRIPTION OF EMBODIMENTS

Figure 1:
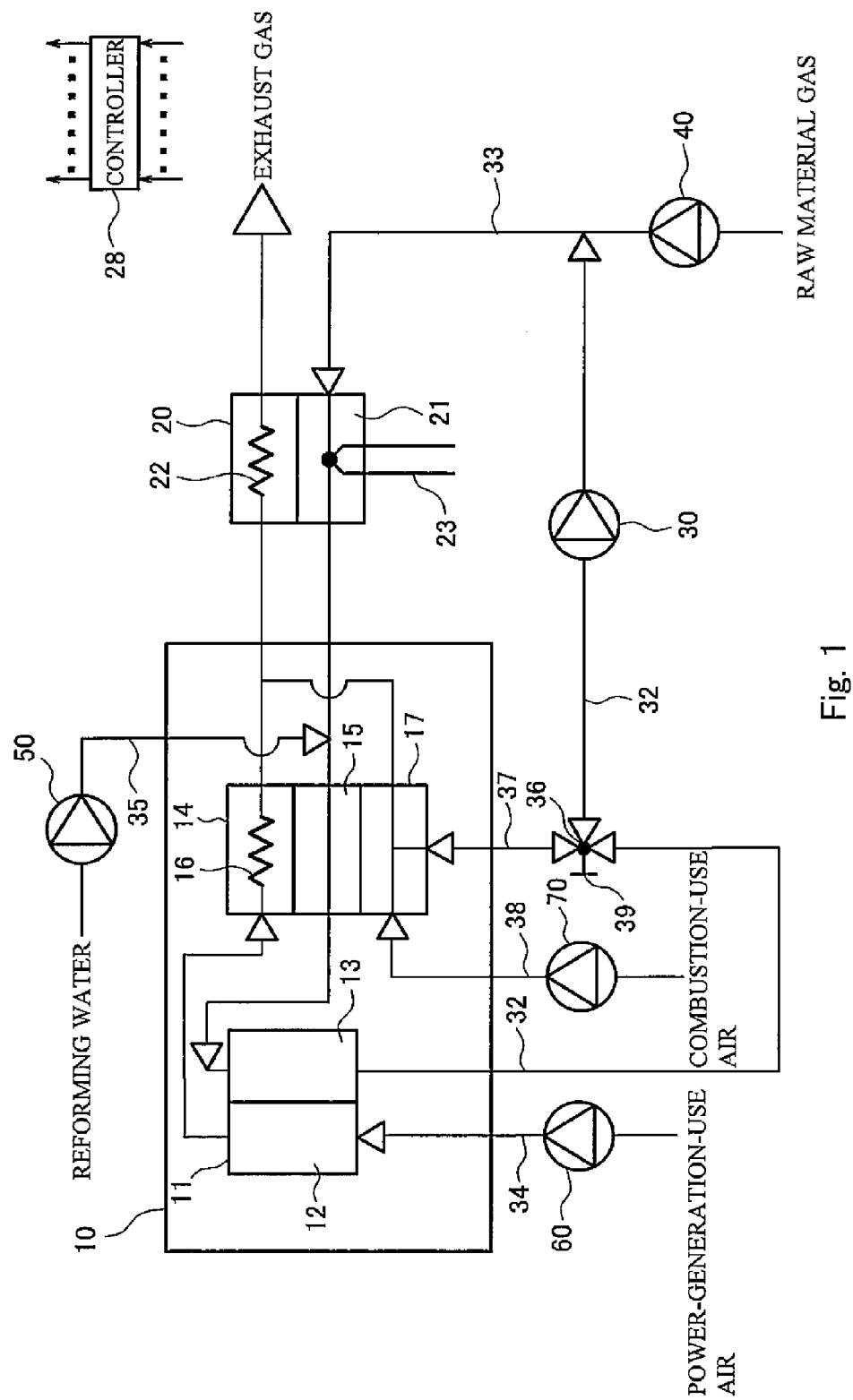
FIG. 1 is a schematic diagram showing one example of a schematic configuration of a fuel cell system according to Embodiment 1 of the present invention.

Background that has LED to One Embodiment of the Present Invention

The inventors of the present invention conducted diligent studies regarding SOFC systems of a hot module type adopting a hydrodesulfurization method, such as the conventional SOFC system described in Background Art. As a result of the diligent studies, the inventors of the present invention obtained findings as described below. Specifically, the inventors found out that, in a configuration where the heat of an exhaust gas generated as a result of combusting an anode off gas in a combustor is utilized for a reforming reaction in a reformer and also for a hydrodesulfurization reaction in a hydrodesulfurizer, if the fuel type of a supplied raw material gas changes and thereby the raw material gas composition changes, then the hydrodesulfurizer does not operate stably.

A specific description is given below with reference to Table 1. Table 1 shows a higher heating value and a reforming water equivalent per mole of hydrogen generation for each fuel type utilized as the raw material gas, and also shows the following values in association with each other: a molecular weight of each fuel type; a higher heating value per mole of each fuel type; reforming energy per mole of each fuel type; a hydrogen generation amount per mole of each fuel type; and a reforming water equivalent per mole of each fuel type.

As shown in Table 1, for example, the higher heating value per mole of methane is 889.20 kJ/mol. In steam reforming, 4 moles of hydrogen are generated from 1 mole of methane and 2 moles of reforming water. Energy necessary for causing the reforming reaction (i.e., reforming energy per mole of the fuel type) is 165 kJ/mol, which is synonymous with the following: a heating value of 222.30 kJ/mol in terms of combustion amount, 0.5 moles of reforming water, and 41.25 kJ of reforming energy are required in order to generate 1 mole of hydrogen.

It is clear from Table 1 that the higher heating value per mole of hydrogen generation does not vary much among the fuel types. However, the more the molecular weight of the fuel type, the less the reforming energy per mole of hydrogen generation.

TABLE 1

| Fuel Type | Molecular Weight | Higher Heating Value per Mole of Fuel (kJ/mol) | Reforming Energy per Mole of Fuel (kJ/mol) | Hydrogen Generation Amount per Mole of Fuel (mol/mol) | Reforming Water Equivalent per Mole of Fuel (mol/mol) | Higher Heating Value per Mole of Hydrogen Generation (kJ/mol) | Reforming Energy per Mole of Hydrogen Generation (kJ/mol) |
|---|---|---|---|---|---|---|---|
| $CH_4$ | 16 | 889.20 | 165.00 | 4 | 2 | 222.30 | 41.25 |
| $C_2H_6$ | 30.1 | 1563.70 | 265.00 | 7 | 4 | 223.39 | 37.86 |
| $C_3H_8$ | 44.1 | 2221.23 | 373.20 | 10 | 6 | 222.12 | 37.32 |
| $i-C_4H_{10}$ | 58.1 | 2869.44 | 483.80 | 13 | 8 | 220.73 | 37.22 |
| $n-C_4H_{10}$ | 58.1 | 2878.62 | 483.80 | 13 | 8 | 221.43 | 37.22 |

As described above, the higher heating value per mole of hydrogen generation does not vary much among the fuel types. However, the reforming energy necessary per mole of hydrogen generation varies among the fuel types.

That is, on a combustion amount basis, the amount of raw material gas fed into the fuel cell system in order to generate hydrogen necessary for generating 1 kW of electric power by means of the fuel cell is the same whether the fuel type is methane or propane. For example, assume that the power generation efficiency of the fuel cell system is 33.3%, and 1 kW of electric power is to be generated. In this case, in order to generate hydrogen necessary for generating 3 kW of electric power, substantially the same amount of raw material gas is fed into the fuel cell system whether fuel type is methane or propane.

However, as shown in Table 1, in the case where the fuel type is butane, reforming energy necessary for reforming the raw material gas that has been fed (i.e., reforming energy per mole of hydrogen generation) is less than in the case where the fuel type is methane. Accordingly, when the case where butane is used as the raw material gas is compared with the case where methane is used as the raw material gas, the amount of heat consumed as reforming energy in the former case is less than in the latter case. Therefore, in the case where butane is used as the raw material gas, the thermal energy of an exhaust gas discharged from a hot module (a casing part) 10, the hot module 10 being a heat insulating unit formed by integrating a fuel cell, a reformer, a combustor, and the like together, is greater than in the case where methane is used as the raw material gas.

Figure 8:
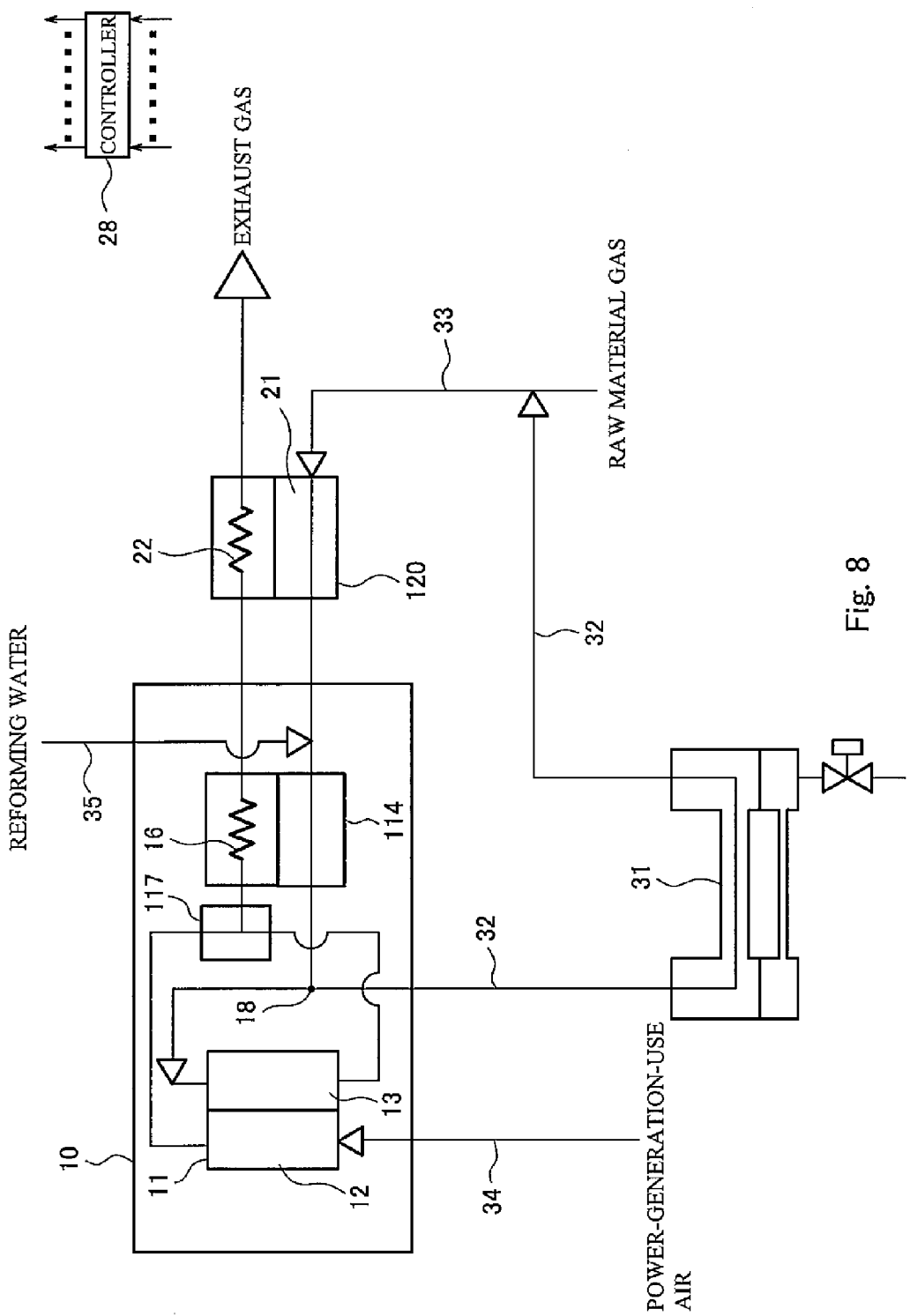
FIG. 8 is a schematic diagram showing a schematic configuration of a fuel cell system according to a comparative example of the present invention.

For example, in a fuel cell system as shown in FIG. 8, in which a hydrodesulfurizer 120 operates by utilizing the thermal energy of the exhaust gas discharged from the hot module 10, when the raw material gas is changed from methane to butane, the temperature of the exhaust gas increases, and as a result, the temperature of a desulfurization catalyst 21 in the hydrodesulfurizer 120 changes. FIG. 8 is a schematic diagram showing a schematic configuration of the fuel cell system according to a comparative example of the present invention.

As shown in FIG. 8, the fuel cell system serving as a comparative example includes: an SOFC 11, a reformer 114, and a combustor 117, which are housed in the hot module 10; and the hydrodesulfurizer 120, a gas-liquid separator 31, and a controller 28, which are arranged outside the hot module 10. The controller 28 performs various controls of the components of the fuel cell system.

In the above configuration, a raw material gas supplied through a raw material gas passage 33 is desulfurized by the hydrodesulfurizer 120, and thereafter reformed by the reformer 114. The reformer 114 is supplied with reforming water (steam) through a reforming water passage 35. The reformer 114 is configured to perform steam reforming by utilizing the reforming water.

A reformed gas, which is generated as a result of the reforming by the reformer 114, branches at a branch point 18. Most of the reformed gas is supplied to an anode 13 of the SOFC 11, and is utilized for electric power generation.

On the other hand, the reformed gas that is not supplied to the anode 13 flows from the branch point 18 through a recycle passage 32. The recycle passage 32 extends through the gas-liquid separator 31, and connects to the raw material gas passage 33. The reformed gas that flows through the recycle passage 32 is supplied to the raw material gas passage 33 after the steam contained in the gas is condensed in the gas-liquid separator 31.

The fuel cell system according to the comparative example is configured such that power generation exhaust heat from the SOFC 11 is mainly removed by air that is supplied to a cathode 12 through an air passage 34. Then, air discharged from the cathode 12 (i.e., a cathode off gas) and the reformed gas that is discharged from the anode 13 without being utilized (i.e., an anode off gas) are combusted by the combustor 117. An exhaust gas generated as a result of the combustion is supplied to the reformer 114.

That is, reforming energy in the reformer 114 is obtained from exhaust heat from the fuel cell and combustion heat from the combustion of the anode off gas. Specifically, as shown in FIG. 8, the reformer 114 includes a reformer heat receiver 16, and is configured to take in part of the thermal energy of the exhaust heat from the fuel cell and the combustion heat via the reformer heat receiver 16. The exhaust gas is, after part of its thermal energy is utilized as reforming energy, discharged to the outside of the hot module 10, and guided to the hydrodesulfurizer 120. The hydrodesulfurizer 120 is configured to obtain a necessary amount of heat for hydrodesulfurizing the raw material gas from the thermal energy of the exhaust gas via a hydrodesulfurizer heat receiver 22.

As described above, if the composition of the raw material gas supplied to the fuel cell system changes, then reforming energy necessary for generating 1 mole of hydrogen changes. Consequently, the thermal energy of the exhaust gas discharged from the hot module 10 changes. Hereinafter, the influence of a change in the composition of the raw material gas on the desulfurization performance of the hydrodesulfurizer 120 is discussed.

First, a situation where the fuel type of the supplied raw material gas changes and thereby the composition of the supplied raw material gas changes is described by taking grid gases in Europe as one example. Specifically, Table 2 shows a reference gas composition table for the European grid gases (i.e., a table showing a reference gas composition for each gas source), which is extracted from the technical rules worksheet G260 of the German Technical and Scientific Association for Gas and Water (DVGW), and also shows a higher heating value and reforming energy per mole of hydrogen generation for each fuel type (i.e., for each gas source).

TABLE 2

| | Fuel Type | Methane | Ethane | Propane | Butane | Carbon Dioxide | Nitrogen | Oxygen | Combustion Heating Value per Volumetric Flow (kJ/L) | Higher Heating Value per Mole of Hydrogen Generation (kJ/mol) | Reforming Energy per Mole of Hydrogen Generation (kJ/mol) |
|---|---|---|---|---|---|---|---|---|---|---|---|
| H Gas | Russia | 98.30 | 0.50 | 0.20 | 0.10 | 0.10 | 0.80 | 0.00 | 39.70 | 222.31 | 41.19 |
| | North Sea 1 | 88.60 | 8.40 | 1.70 | 0.70 | 0.00 | 0.60 | 0.00 | 43.62 | 222.42 | 40.56 |
| | North Sea 2 | 83.00 | 11.60 | 3.10 | 0.50 | 0.30 | 1.50 | 0.00 | 44.76 | 222.47 | 40.31 |
| | Combined Gas | 88.60 | 5.30 | 1.40 | 0.60 | 1.40 | 2.70 | 0.00 | 41.03 | 222.38 | 40.74 |
| | Russia + Propane + Air | 59.70 | 0.06 | 20.25 | 0.30 | 0.06 | 15.57 | 4.06 | 44.21 | 222.22 | 39.42 |
| | Russia + Butane + Air | 66.90 | 0.07 | 0.14 | 13.39 | 0.07 | 15.55 | 3.88 | 43.95 | 221.96 | 39.65 |

TABLE 2-continued

| | Fuel Type | Methane | Ethane | Propane | Butane | Carbon Dioxide | Nitrogen | Oxygen | Combustion Heating Value per Volumetric Flow (kJ/L) | Higher Heating Value per Mole of Hydrogen Generation (kJ/mol) | Reforming Energy per Mole of Hydrogen Generation (kJ/mol) |
|---|---|---|---|---|---|---|---|---|---|---|---|
| L Gas | Holland 1 | 81.30 | 2.80 | 0.40 | 0.30 | 1.00 | 14.20 | 0.00 | 35.01 | 222.35 | 40.97 |
| | Holland 2 | 82.90 | 3.70 | 0.70 | 0.30 | 1.30 | 11.10 | 0.00 | 36.57 | 222.37 | 40.89 |
| | East Hanover | 79.50 | 1.10 | 0.10 | 0.00 | 0.70 | 18.60 | 0.00 | 32.43 | 222.33 | 41.16 |
| | Holland 1 + Propane + Air | 47.10 | 1.60 | 19.20 | 0.17 | 0.58 | 26.50 | 4.85 | 39.07 | 222.24 | 39.21 |
| | Holland 1 + Butane + Air | 53.60 | 1.80 | 0.26 | 12.40 | 0.66 | 26.60 | 4.68 | 38.73 | 221.98 | 39.45 |

As shown in Table 2, there are eleven fuel types in total, i.e., eleven gas sources serving as sources of natural gas, including a Russian gas source, North Sea gas fields 1 and 2, a combined gas obtained by combining gases supplied from a plurality of gas sources, and a mixture of the gas from the Russian gas source, propane, and air.

As shown in Table 2, the gas composition varies from gas source to gas source. Therefore, in the case of a system such as one in Europe where natural gas is supplied by pipeline directly from any one of a plurality of types of gas sources, and the natural gas is supplied to each consumer after its composition is adjusted, the composition of the raw material gas may be different from the previous one depending on the timing of the supply of the gas. That is, based on daily changes in the price of natural gas in the market, gas suppliers choose a gas source from which the gas can be procured at a cheaper price, and supply the raw material gas from the gas source. Alternatively, gas suppliers combine raw material gases procured from a plurality of gas sources, and supply the combined gas to consumers.

In order to effectively activate the desulfurization catalyst 21 packed in the hydrodesulfurizer 120, it is necessary to heat the desulfurization catalyst 21 of the hydrodesulfurizer 120 to be within the most suitable temperature range (optimal temperature range). For example, the optimal temperature range of the desulfurization catalyst 21 is very narrow, such as 280° C.±30° C. At temperatures lower than the optimal temperature range, the catalytic activity of the desulfurization catalyst 21 is low, and the desulfurization performance is insufficient. At temperatures higher than the optimal temperature range, the life of the desulfurization catalyst 21 is reduced due to thermal degradation, and thus the desulfurization catalyst 21 cannot be used for a long term.

For the above reasons, in the fuel cell system including the hydrodesulfurizer 120, although the electric power generation performance does not depend on the type of the fuel supplied as the raw material gas, there is a case where the composition of the raw material gas changes, for example, to become heavy, and thereby the temperature of the exhaust gas changes, causing the temperature of the desulfurization catalyst 21 to deviate from the optimal temperature range. If the temperature of the desulfurization catalyst 21 deviates from the optimal temperature range, the performance of the desulfurization catalyst 21 cannot be kept constant, and the life of the desulfurization catalyst 21 is impaired, which makes it impossible to use the desulfurization catalyst 21 for a long term.

It should be noted that the composition of the raw material gas changes not only in the above-described example regarding Europe, but also in the case of a hybrid fuel cell system that uses a grid gas for normal operation and LPG in a time of emergency. In this case, the composition of the raw material gas changes due to the switch from the grid gas to LPG. Therefore, problems such as the above-described degradation in the performance of the desulfurization catalyst and reduction of the life of the desulfurization catalyst arise also in such hybrid fuel cell systems.

Based on the above-described findings, the inventors of the present invention have found out that even if the composition of the raw material gas has changed, the hydrodesulfurizer can be operated stably by controlling the distribution amount of the anode off gas supplied to the combustor and the distribution amount of the anode off gas supplied to the raw material gas passage, and thus arrived at the present invention. To be specific, the present invention provides various aspects as described below.

A fuel cell system according to a first aspect of the present invention includes: a reformer configured to generate a reformed gas from a raw material gas, water, and air that are supplied to the reformer, the reformed gas serving as a fuel gas; a fuel cell configured to generate electric power through a power-generating reaction by utilizing the fuel gas and air; a combustor configured to combust an anode off gas, the anode off gas being the fuel gas that has not been utilized in the fuel cell; a casing part housing at least the reformer, the fuel cell, and the combustor, which are covered with a heat insulating material; and a desulfurizer configured to remove a sulfur component from the raw material gas supplied thereto by hydrodesulfurization. The anode off gas is supplied to the combustor and the desulfurizer in a distributed manner, and the desulfurizer performs the hydrodesulfurization of the raw material gas by utilizing the supplied anode off gas as a hydrogen source and utilizing an exhaust gas discharged from the casing part as a heat source, the exhaust gas containing at least combustion heat from the combustor.

According to the above configuration, the desulfurizer is configured such that the anode off gas can be utilized as a hydrogen source at the time of performing the hydrodesulfurization. Specifically, the anode off gas contains the fuel gas that has not been utilized in the fuel cell. Therefore, the anode off gas contains hydrogen, and the hydrogen can be utilized to perform the hydrodesulfurization. In other words, the anode off gas, all of which is combusted by a combustor in conventional art, can be utilized as a hydrogen source when the desulfurizer performs the hydrodesulfurization.

One example of a reforming method of generating the reformed gas from the raw material gas, water, and air is oxidative steam reforming. In oxidative steam reforming, if the amount of air supplied to the reformer is changed, then reforming energy consumed by the reformer changes, and thereby the thermal energy of the exhaust gas also changes. Therefore, by adjusting the flow rate of the air supplied to the reformer, the thermal energy of the exhaust gas discharged from the casing can be suitably adjusted.

Thus, even in a case where the composition of the supplied raw material gas changes, causing a change in reforming energy consumed by the reformer, resulting in a change in the thermal energy of the exhaust gas discharged from the casing part, the thermal energy of the exhaust gas can be made constant by adjusting the flow rate of the air supplied to the reformer. This makes it possible to prevent the following situation: the temperature of a desulfurization catalyst in the desulfurizer, which performs the desulfurization by utilizing the exhaust gas as a heat source, becomes an undesired temperature, and the desulfurization cannot be performed efficiently.

Therefore, the fuel cell system according to the first aspect of the present invention provides an advantageous effect of allowing the hydrodesulfurizer to operate stably even if the composition of the raw material gas has changed.

A fuel cell system according to a second aspect of the present invention may be configured such that the fuel cell system according to the above first aspect includes: an air supplying unit configured to adjust a flow rate of the air supplied to the reformer; a temperature detector configured to detect a temperature of a desulfurization catalyst packed in the desulfurizer; and a controller configured to control the flow rate of the air supplied by the air supplying unit based on a result of detection by the temperature detector.

Since the above configuration includes the air supplying unit, the temperature detector, and the controller, the air supplying unit can supply air in a suitable proportion to the raw material supplied to the reformer owing to the control that the controller performs based on the result of the detection by the temperature detector. That is, the air supplying unit can supply air to the reformer in such a manner that the temperature of the desulfurization catalyst becomes an optimal temperature.

A fuel cell system according to a third aspect of the present invention may be configured such that, in the above second aspect, if the result of the detection by the temperature detector indicates that the temperature of the desulfurization catalyst is higher than an optimal temperature range, the optimal temperature range being defined as a temperature range that allows effective activity of the desulfurization catalyst, the controller controls the air supplying unit to decrease an amount of the air supplied to the reformer such that a proportion of the air to the fuel gas decreases, and if the result of the detection by the temperature detector indicates that the temperature of the desulfurization catalyst is lower than the optimal temperature range, the controller controls the air supplying unit to increase the amount of the air supplied to the reformer such that the proportion of the air to the fuel gas increases.

When the amount of air supplied to the reformer decreases, the amount of raw material gas subjected to steam reforming increases. As a result, reforming energy consumed by the reformer increases. Consequently, the temperature of the exhaust gas discharged from the casing part decreases. Therefore, the amount of heat of the exhaust gas discharged from the casing part can be decreased, and the temperature of the desulfurization catalyst higher than the optimal temperature range can be decreased.

On the other hand, when the amount of air supplied to the reformer increases, the amount of raw material gas subjected to partial oxidation increases and the amount of raw material gas subjected to steam reforming decreases. As a result, reforming energy consumed by the reformer decreases. Consequently, the temperature of the exhaust gas discharged from the casing part increases. Therefore, the amount of heat of the exhaust gas discharged from the casing part can be increased, and the temperature of the desulfurization catalyst lower than the optimal temperature range can be increased.

A fuel cell system according to a fourth aspect of the present invention may be configured such that the fuel cell system according to the above second aspect further includes a distributor configured to distribute the anode off gas to the combustor and the desulfurizer while adjusting an amount of the anode off gas supplied to the combustor and an amount of the anode off gas supplied to the desulfurizer. The controller controls the flow rate of the air supplied by the air supplying unit based on the result of the detection by the temperature detector, and controls a distribution ratio of the anode off gas distributed by the distributor.

A fuel cell system according to a fifth aspect of the present invention may be configured such that, in the above fourth aspect, if the result of the detection by the temperature detector indicates that the temperature of the desulfurization catalyst is higher than an optimal temperature range, the optimal temperature range being defined as a temperature range that allows effective activity of the desulfurization catalyst, the controller controls the air supplying unit to decrease an amount of the air supplied to the reformer such that a proportion of the air to the fuel gas decreases, and controls the distributor to decrease the amount of the anode off gas supplied to the combustor and increase the amount of the anode off gas supplied to the desulfurizer, and if the result of the detection by the temperature detector indicates that the temperature of the desulfurization catalyst is lower than the optimal temperature range, the controller controls the air supplying unit to increase the amount of the air supplied to the reformer such that the proportion of the air to the fuel gas (i.e., air/fuel gas ratio) increases, and controls the distributor to increase the amount of the anode off gas supplied to the combustor and decrease the amount of the anode off gas supplied to the desulfurizer.

According to the above configuration, if the temperature of the desulfurization catalyst is higher than the optimal temperature range, the controller controls the air supplying unit to decrease the amount of the air supplied to the reformer such that the proportion of the air to the fuel gas (i.e., air/fuel gas ratio) decreases. In addition, the controller controls the distributor to decrease the amount of the anode off gas supplied to the combustor and increase the amount of the anode off gas supplied to the desulfurizer.

On the other hand, if the temperature of the desulfurization catalyst is lower than the optimal temperature range, the controller controls the air supplying unit to increase the amount of the air supplied to the reformer such that the proportion of the air to the fuel gas (i.e., air/fuel gas ratio) increases. In addition, the controller controls the distributor to increase the amount of the anode off gas supplied to the combustor and decrease the amount of the anode off gas supplied to the desulfurizer.

As described above, the controller can adjust not only the amount of the air supplied to the reformer, but also the distribution ratio of the anode off gas, which is distributed to the combustor and the desulfurizer by the distributor. This makes it possible to precisely adjust the temperature of the exhaust gas to be within a desired temperature range, and precisely adjust the temperature of the desulfurization catalyst to be within the optimal temperature range.

A fuel cell system according to a sixth aspect of the present invention includes: a reformer configured to generate a reformed gas from a raw material gas and water that are supplied to the reformer, the reformed gas serving as a fuel gas; a fuel cell configured to generate electric power through a power-generating reaction by utilizing the fuel gas and air; a combustor configured to combust an anode off gas, the anode off gas being the fuel gas that has not been utilized in the fuel cell; a casing part housing at least the reformer, the fuel cell, and the combustor, which are covered with a heat insulating material; and a desulfurizer configured to remove a sulfur component from the raw material gas supplied thereto by hydrodesulfurization. The anode off gas is supplied to the combustor and the desulfurizer in a distributed manner, and the desulfurizer performs the hydrodesulfurization of the raw material gas by utilizing the supplied anode off gas as a hydrogen source and utilizing an exhaust gas discharged from the casing part as a heat source, the exhaust gas containing at least combustion heat from the combustor.

According to the above configuration, the desulfurizer is configured such that the anode off gas can be utilized as a hydrogen source at the time of performing the hydrodesulfurization. Specifically, the anode off gas contains the fuel gas that has not been utilized in the fuel cell. Therefore, the anode off gas contains hydrogen, and the hydrogen can be utilized to perform the hydrodesulfurization. In other words, the anode off gas, all of which is combusted by a combustor in conventional art, can be utilized as a hydrogen source when the desulfurizer performs the hydrodesulfurization.

If the amount of the anode off gas supplied to the combustor is changed, then the amount of combustion by the combustor changes, and thereby the thermal energy of the exhaust gas also changes. In addition, if the amount of the anode off gas supplied to the desulfurizer is changed, then the amount of gas flowing into the casing part together with the raw material gas changes. This causes a change in thermal energy that is utilized to preheat the raw material gas before the raw material gas is supplied to the fuel cell. As a result, the thermal energy of the exhaust gas discharged from the casing part also changes.

Therefore, the thermal energy of the exhaust gas discharged from the casing can be suitably adjusted by adjusting the amount of anode off gas distributed to the combustor and the amount of anode off gas distributed to the desulfurizer.

Thus, even in a case where the composition of the supplied raw material gas changes, causing a change in reforming energy consumed by the reformer, resulting in a change in the thermal energy of the exhaust gas discharged from the casing part, the thermal energy of the exhaust gas can be made constant by adjusting the amount of anode off gas distributed to the combustor and the amount of anode off gas distributed to the desulfurizer. This makes it possible to prevent the following situation: the temperature of a desulfurization catalyst in the desulfurizer, which performs the desulfurization by utilizing the exhaust gas as a heat source, becomes an undesired temperature, and the desulfurization cannot be performed efficiently.

Therefore, the fuel cell system according to the sixth aspect of the present invention provides an advantageous effect of allowing the hydrodesulfurizer to operate stably even if the composition of the raw material gas has changed.

A fuel cell system according to a seventh aspect of the present invention may be configured such that the fuel cell system according to the above sixth aspect includes: a distributor configured to distribute the anode off gas to the combustor and the desulfurizer while adjusting an amount of the anode off gas supplied to the combustor and an amount of the anode off gas supplied to the desulfurizer; a temperature detector configured to detect a temperature of a desulfurization catalyst packed in the desulfurizer; and a controller configured to control a distribution ratio of the anode off gas distributed by the distributor based on a result of detection by the temperature detector.

Since the above configuration includes the distributor, the temperature detector, and the controller, the distributor can supply the anode off gas to the combustor and the desulfurizer at a suitable ratio owing to the control that the controller performs based on the result of the detection by the temperature detector.

That is, the anode off gas can be supplied to the combustor and the desulfurizer in a distributed manner so that the temperature of the desulfurization catalyst will become an optimal temperature.

A fuel cell system according to an eighth aspect of the present invention may be configured such that, in the above seventh aspect, if the result of the detection by the temperature detector indicates that the temperature of the desulfurization catalyst is higher than an optimal temperature range, the optimal temperature range being defined as a temperature range that allows effective activity of the desulfurization catalyst, the controller controls the distributor to decrease the amount of the anode off gas supplied to the combustor and increase the amount of the anode off gas supplied to the desulfurizer, and if the result of the detection by the temperature detector indicates that the temperature of the desulfurization catalyst is lower than the optimal temperature range, the controller controls the distributor to increase the amount of the anode off gas supplied to the combustor and decrease the amount of the anode off gas supplied to the desulfurizer.

If the amount of the anode off gas supplied to the combustor is decreased, then the amount of heat from the combustion by the combustor decreases. In addition, if the amount of the anode off gas supplied to the desulfurizer is increased, then the flow rate of gas supplied into the casing part together with the raw material gas through the desulfurizer increases. This causes an increase in thermal energy that is consumed to preheat the raw material gas before the raw material gas is supplied to the fuel cell. As a result, the temperature in the casing part decreases.

Therefore, the amount of heat of the exhaust gas discharged from the casing part can be decreased, and the temperature of the desulfurization catalyst higher than the optimal temperature range can be decreased.

On the other hand, if the amount of the anode off gas supplied to the combustor is increased and the amount of the anode off gas supplied to the desulfurizer is decreased, then the temperature in the casing part increases.

Therefore, the amount of heat of the exhaust gas discharged from the casing part can be increased, and the temperature of the desulfurization catalyst lower than the optimal temperature range can be increased.

A fuel cell system according to another aspect of the present invention may be configured such that the fuel cell system according to any one of the above first to eighth aspects includes a gas-liquid separator configured to condense the anode off gas to remove moisture from the anode off gas, and supplies the anode off gas from which the moisture has been removed by the gas-liquid separator to the combustor and the desulfurizer.

Since the above configuration includes the gas-liquid separator, moisture can be removed from the anode off gas before the anode off gas reaches the combustor and the desulfurizer. This makes it possible to prevent a reduction reaction catalyzed by the desulfurization catalyst from being hindered by the steam contained in the anode off gas. Moreover, the combustion of the anode off gas fed to the combustor can be prevented from becoming unstable.

Furthermore, if the gas-liquid separator is disposed upstream from the distributor, then failure, water blockage, or the like due to steam can be prevented from occurring in the distributor.

This makes it possible to improve the operational reliability of the fuel cell system.

In the other aspect described above, the configuration may be such that the moisture removed by the gas-liquid separator is supplied to the reformer.

According to the above configuration, the moisture removed by the gas-liquid separator can be supplied as reforming water. Therefore, the fuel cell system can be installed at a location where there is no water infrastructure or the like. This allows the fuel cell according to the eighth aspect of the present invention to be widely applicable as a power supply, such as a portable power supply or an in-vehicle APU (Auxiliary Power Unit), for example.

Embodiment 1

Hereinafter, Embodiment 1 of the present invention is described with reference to FIG. 1. In all of the drawings, the same or corresponding components are denoted by the same reference signs, and repeating the same descriptions is avoided below. FIG. 1 is a schematic diagram showing one example of a schematic configuration of a fuel cell system according to Embodiment 1 of the present invention.

As shown in FIG. 1, similar to the fuel cell system according to the comparative example shown in FIG. 8, the fuel cell system according to Embodiment 1 includes: an SOFC (a fuel cell) 11, a reformer 14, and a combustor 17, which are housed in a hot module (a casing part) 10; and a hydrodesulfurizer (a desulfurizer) 20 disposed outside the hot module 10. That is, the hot module 10 houses at least the SOFC 11, the reformer 14, and the combustor 17, which are covered with a heat insulating material (not shown).

In this configuration, the pressure of a raw material gas supplied from the outside is increased by a raw material booster pump 40, and the raw material gas whose pressure has been increased is fed to the hydrodesulfurizer 20 through a raw material gas passage 33. When the raw material gas is fed to the hydrodesulfurizer 20, a reaction between sulfur components contained in the raw material gas and hydrogen is catalyzed by a desulfurization catalyst 21. As a result, the sulfur components are converted into hydrogen sulfide. Then, the hydrogen sulfide is removed by the desulfurization catalyst 21. It should be noted that the desulfurization catalyst 21 packed in the hydrodesulfurizer 20 is, for example, a catalyst containing copper and zinc.

The hydrodesulfurizer 20 is configured to obtain part of the thermal energy of an exhaust gas discharged from the hot module 10 via a hydrodesulfurizer heat receiver 22. Accordingly, the desulfurization catalyst 21 in the hydrodesulfurizer 20 is heated to a desired temperature (about 300° C.). It should be noted that in a case where the raw material gas is supplied from a plurality of types of gas sources, the supplied raw material gas contains not only odorant components but also various sulfur components derived from the gas sources. Therefore, preferably, a hydrodesulfurization method that is capable of desulfurizing various kinds of sulfur components is applicable to the hydrodesulfurizer 20.

The hydrodesulfurizer 20 further includes a hydrodesulfurization temperature detector (a temperature detector) 23. The hydrodesulfurizer 20 is configured to monitor the temperature of the desulfurization catalyst 21 by means of the hydrodesulfurization temperature detector 23. It should be noted that the hydrodesulfurization temperature detector 23 may be constituted by a thermocouple or a thermopile, for example. The hydrodesulfurization temperature detector 23 transmits a detection result to a controller 28.

After the raw material gas is desulfurized by the hydrodesulfurizer 20, a reforming water pump 50 increases the pressure of the raw material gas, mixes the raw material gas with reforming water (steam) supplied through a reforming water passage 35, and feeds the mixture to the reformer 14. Thereafter, a reaction between the desulfurized raw material gas and the steam is catalyzed by a reforming catalyst 15, and thereby a hydrogen-containing reformed gas is generated. It should be noted that, for example, Ni-supporting $Al_2O_3$ (alumina) whose spherical surface is impregnated with Ni, or $Al_2O_3$ with ruthenium added to its spherical surface, may be suitably used as the reforming catalyst 15, which is packed in the reformer 14.

As shown in FIG. 1, the reformer 14 includes a reformer heat receiver 16. The reformer 14 is configured to take in, via the reformer heat receiver 16, part of the thermal energy of power generation exhaust heat contained in a cathode off gas discharged from a cathode 12 of the SOFC 11. The reformer 14 is disposed adjacent to the combustor 17, and is configured to be heated also by receiving part of the thermal energy of combustion heat from the combustor 17. In this manner, the reforming catalyst 15 in the reformer 14 is heated approximately to a desired temperature (about 600 to 700° C.) for steam reforming.

The reformed gas generated by the reformer 14 is supplied to an anode 13 of the SOFC 11 as a fuel gas. Meanwhile, power-generation-use air, which is supplied from the outside, is supplied to the cathode 12 of the SOFC 11. The pressure of the power-generation-use air is increased by a cathode air booster pump 60, and the power-generation-use air whose pressure has been increased is fed to the cathode 12 of the SOFC 11 through an air passage 34.

By utilizing the fuel gas (reformed gas) and the air (power-generation-use air) supplied in this manner, the SOFC 11 generates electric power through a power-generating reaction. The electric power generated by the SOFC 11 is supplied to an electrical load, which is not shown, via electrical wiring, which is not shown, and is consumed by the electrical load. Power generation exhaust heat generated as a result of the power generation by the SOFC 11 is removed by the power-generation-use air supplied to the cathode 12, and as previously described, fed to the reformer 14 as the cathode off gas.

The fuel gas (reformed gas) supplied to the anode 13 is discharged to a recycle passage 32 as an anode off gas containing hydrogen that has not been utilized in the power-generating reaction of the SOFC 11. The anode off gas discharged from the SOFC 11 has a high temperature due to, for example, the power generation exhaust heat. Before the anode off gas is discharged from the hot module 10 through the recycle passage 32, part of the thermal energy of the anode off gas is transferred to the power-generation-use air that is to be supplied to the SOFC 11 via an air preheater which is not shown. Thereafter, the anode off gas is discharged from the hot module 10.

The recycle passage 32 extends from the SOFC 11 to the raw material gas passage 33. A branch point 36 is provided on the recycle passage 32. A combustion-use gas passage 37 branches off from the recycle passage 32 at the branch point 36, and connects to the combustor 17.

With the above passage configuration, the anode off gas flowing through the recycle passage 32 branches at the branch point 36, such that part of the anode off gas is fed to the combustor 17 through the combustion-use gas passage 37. The pressure of the remaining anode off gas is increased by a hydrogenation booster pump 30, and the anode off gas whose pressure has been increased is guided to the raw material gas passage 33 through the recycle passage 32.

A distributor 39 is provided at the branch point 36. The distributor 39 distributes the anode off gas flowing through the combustion-use gas passage 37 and the anode off gas flowing through the recycle passage 32 at a suitable ratio. For example, the distributor 39 may be configured as a three-way valve including a solenoid switching valve capable of controlling the area of opening of each passage in a stepless manner proportional to a signal (a current value) transmitted from the controller 28.

The pressure of combustion-use air supplied from the outside is increased by a combustion air booster pump 70. The combustor 17 is configured to be supplied with the combustion-use air, whose pressure has been increased, through a combustion-use air passage 38. The combustor 17 mixes the combustion-use air with the anode off gas supplied thereto, and combusts the mixture. The thermal energy of an exhaust gas generated as a result of the combustion, and the thermal energy of the above-described cathode off gas, are utilized to heat the reforming catalyst 15 of the reformer 14.

The exhaust gas generated in the combustor 17 is mixed with the cathode off gas that has flowed through the reformer heat receiver 16 of the reformer 14, and then passes through the hydrodesulfurizer heat receiver 22 of the hydrodesulfurizer 20. When the exhaust gas mixed with the cathode off gas passes through the hydrodesulfurizer heat receiver 22, part of the thermal energy of the exhaust gas is transferred to the hydrodesulfurizer 20, and then the exhaust gas is discharged to the outside of the system.

As described above, thermal energy transferred to the reforming catalyst 15 is the sum of: thermal energy received from the cathode off gas; and thermal energy received from the combustion heat from the combustor 17. Therefore, for example, even if reforming energy consumed by the reformer 14 decreases due to a change in the type of the supplied fuel, the temperature of the exhaust gas discharged from the hot module 10 can be made constant, and the exhaust gas having the constant temperature can be guided to the hydrodesulfurizer 20 as described below.

Specifically, adjustment is made to decrease the amount of anode off gas combusted by the combustor 17 while keeping the thermal energy that the reforming catalyst 15 receives from the cathode off gas constant. In this manner, the amount of combustion by the combustor 17 can be decreased, and the thermal energy that the reforming catalyst 15 receives from the combustion heat can be decreased.

As described above, by decreasing the thermal energy obtained from the combustion heat in accordance with a decrease in the consumed reforming energy, the temperature of the exhaust gas mixed with the cathode off gas can be made constant, and the exhaust gas having the constant temperature can be guided to the hydrodesulfurizer 20. On the other hand, if the reforming energy consumed by the reformer 14 has increased, then adjustment is made so as to increase the amount of anode off gas combusted by the combustor 17. In this manner, the amount of combustion by the combustor 17 can be increased, and the thermal energy that the reforming catalyst 15 receives from the combustion heat can be increased in accordance with the increase in the consumed reforming energy. Consequently, the temperature of the exhaust gas mixed with the cathode off gas can be made constant, and the exhaust gas having the constant temperature can be guided to the hydrodesulfurizer 20.

It should be noted that the cathode 12 of the SOFC 11 may be preheated by utilizing the thermal energy of the exhaust gas generated in the combustor 17 although such a configuration is not shown in FIG. 1. In a case when such a configuration is applied, the exhaust gas generated in the combustor 17 is guided to the cathode 12 of the SOFC 11, and the cathode 12 is heated by the exhaust gas. Then, the exhaust gas is discharged from the hot module 10, and guided to the hydrodesulfurizer 20.

Meanwhile, the anode off gas that is guided to the raw material gas passage 33 through the recycle passage 32 is supplied to the hydrodesulfurizer 20 together with the raw material gas, and hydrogen contained in the anode off gas is utilized for hydrodesulfurization performed by the hydrodesulfurizer 20.

Preheating energy necessary for preheating the raw material gas in the hot module 10 before supplying the raw material gas to the SOFC 11 can be increased by increasing the amount of anode off gas that is flowed through the recycle passage 32 and mixed with the raw material gas. In this manner, the temperature in the hot module 10 can be decreased.

Therefore, if the temperature of the desulfurization catalyst 21 has increased to exceed its optimal temperature range, then as described above, the amount of anode off gas supplied to the combustor 17 is decreased, and thereby the amount of combustion by the combustor 17 is decreased. At the same time, the amount of anode off gas mixed with the raw material gas is increased, and thereby preheating energy necessary for preheating the raw material gas in the hot module 10 is increased. By performing these controls at the same time, the temperature of the exhaust gas discharged from the hot module 10 can be decreased, and the temperature of the desulfurization catalyst 21 can be adjusted to be within the optimal temperature range.

On the other hand, if the temperature of the desulfurization catalyst 21 has decreased to fall out of the optimal temperature range, then as described above, the amount of anode off gas supplied to the combustor 17 is increased, and thereby the amount of combustion by the combustor 17 is increased. At the same time, the amount of anode off gas mixed with the raw material gas is decreased, and thereby preheating energy necessary for preheating the raw material gas in the hot module 10 is decreased. By performing these controls at the same time, the temperature of the exhaust gas discharged from the hot module 10 can be increased, and the temperature of the desulfurization catalyst 21 can be adjusted to be within the optimal temperature range.

As described above, the fuel cell system according to Embodiment 1 is different from the above-described fuel cell system according to the comparative example in that, in the fuel cell system according to Embodiment 1, part of the anode off gas is supplied to the raw material gas passage 33. Specifically, the differences are as follows: hydrogen supplied to the hydrodesulfurizer 20 is obtained not from the reformed gas reformed by the reformer 14 but from the anode off gas whose hydrogen has been consumed by a predetermined amount by the SOFC 11; and part of the anode off gas is distributed to the combustor 17 through the combustion-use gas passage 37, which branches off from the recycle passage 32, and the remaining anode off gas is distributed to the hydrodesulfurizer 20 through the recycle passage 32 and the raw material gas passage 33.

(Control of Temperature of Hydrodesulfurizer)

Next, specific control of the temperature of the hydrodesulfurizer 20 in the fuel cell system configured as described above is described in detail.

The fuel cell system according to the present embodiment includes the controller 28, which performs various controls of the components included in the system. The controller 28 controls the temperature of the hydrodesulfurizer 20 to be within the optimal temperature range. Specifically, the controller 28 controls the distributor 39 based on a result of the detection by the hydrodesulfurization temperature detector 23 to perform control of adjusting the distribution of the anode off gas supplied to the combustor 17 and the anode off gas supplied to the hydrodesulfurizer 20 (i.e., adjust the distribution ratio).

For example, if the composition of the raw material gas changes to become heavy, causing a decrease in reforming energy and causing the temperature of the hydrodesulfurizer 20 to increase to exceed the optimal temperature range, the controller 28 decreases the amount of anode off gas fed to the combustor 17 to decrease the amount of combustion. In this manner, the temperature of the exhaust gas discharged from the hot module 10 to the hydrodesulfurizer 20 can be prevented from increasing due to the decrease in the reforming energy consumed by the reformer 14.

Further, the controller 28 controls the distributor 39 to increase the amount of anode off gas fed to the raw material gas passage 33. As a result, the flow rate of a mixed gas of the raw material gas and the anode off gas, the mixed gas being supplied to the hot module 10, increases. Consequently, energy necessary for preheating the mixed gas in the hot module 10 before supplying the mixed gas to the SOFC 11 (i.e., preheating energy) increases.

By decreasing the amount of combustion by the combustor 17 and increasing the preheating energy consumed in the hot module 10 in the above manner, the temperature of the exhaust gas discharged from the hot module 10 is caused to decrease. By causing the decrease in the temperature of the exhaust gas, the temperature of the hydrodesulfurizer 20 higher than the optimal temperature range can be decreased and adjusted to be within the optimal temperature range.

On the other hand, if the composition of the raw material gas changes such that the reforming energy consumed by the reformer 14 increases, causing the temperature of the hydrodesulfurizer 20 to decrease to be lower than the optimal temperature range, the controller 28 controls the distributor 39 to increase the amount of anode off gas fed to the combustor 17. Further, the controller 28 controls the distributor 39 to decrease the amount of anode off gas fed to the raw material gas passage 33.

By controlling the distributor 39 by means of the controller 28 in the above manner, the amount of combustion by the combustor 17 can be increased in accordance with an increase in the consumed reforming energy. Further, since the amount of anode off gas mixed with the raw material gas is decreased, the flow rate of the mixed gas of the raw material gas and the anode off gas, the mixed gas being supplied to the hot module 10, decreases. Consequently, energy necessary for preheating the mixed gas before supplying the mixed gas to the SOFC 11 (i.e., preheating energy) decreases.

By increasing the amount of combustion by the combustor 17 and decreasing the preheating energy consumed in the hot module 10 in the above manner, the temperature of the exhaust gas discharged from the hot module 10 can be increased. In addition, by causing the increase in the temperature of the exhaust gas, the temperature of the hydrodesulfurizer 20 lower than the optimal temperature range can be increased and adjusted to be within the optimal temperature range.

As described above, the fuel cell system according to Embodiment 1 makes it possible to control the temperature of the hydrodesulfurizer 20 to be within the optimal temperature range even if the composition of the supplied raw material gas changes.

It should be noted that the fuel cell system according to the present embodiment is configured such that the controller 28 controls the distributor 39 based on a result of the detection by the hydrodesulfurization temperature detector 23 to adjust the distribution of the anode off gas supplied to the combustor 17 and the anode off gas supplied to the hydrodesulfurizer 20 (i.e., adjust the distribution ratio). However, the fuel cell system according to the present embodiment is not limited to the above-described configuration where the anode off gas is distributed at a desired ratio by means of the distributor 39.

For example, an alternative configuration may be adopted, in which the hydrogenation booster pump 30 functions as the distributor 39. In such an alternative configuration, the controller 28 controls the operating amount of the hydrogenation booster pump 30 based on a result of the detection by the hydrodesulfurization temperature detector 23. In this manner, the aforementioned distribution ratio of the anode off gas can be adjusted.

Another alternative configuration may be such that the hydrodesulfurization temperature detector 23 always detects the temperature of the desulfurization catalyst 21, and in accordance with the detection results, the controller 28 controls the distributor 39 to adjust the distribution of the anode off gas supplied to the combustor 17 and the anode off gas supplied to the hydrodesulfurizer 20 (i.e., adjust the distribution ratio). Yet another alternative configuration may be such that the hydrodesulfurization temperature detector 23 detects not only the temperature of the desulfurization catalyst 21 but also the temperature of the SOFC 11. In the case of adopting this configuration, if the temperature of the desulfurization catalyst 21 is within the optimal temperature range, the flow rates of the power-generation-use air and the raw material gas supplied to the SOFC 11, and the flow rates of the reforming water and the combustion-use air, are controlled based on the temperature detected by the SOFC 11; and only if the temperature of the desulfurization catalyst 21 deviates from the optimal temperature range, the distribution of the anode off gas supplied to the combustor 17 and the anode off gas supplied to the hydrodesulfurizer 20 (i.e., the distribution ratio) may be adjusted.

(Variation 1)

In the above-described fuel cell system according to Embodiment 1 of the present invention, the reformer 14 performs steam reforming to generate a reformed gas from the raw material gas and the reforming water (steam). However, the method of reforming by the reformer 14 is not thus limited. For example, as Variation 1, the reformer 14 included in the fuel cell system may be configured to perform oxidative steam reforming (OSR reforming) to generate a reformed gas from the raw material gas, the reforming water (steam), and air (reforming air).

Figure 2:
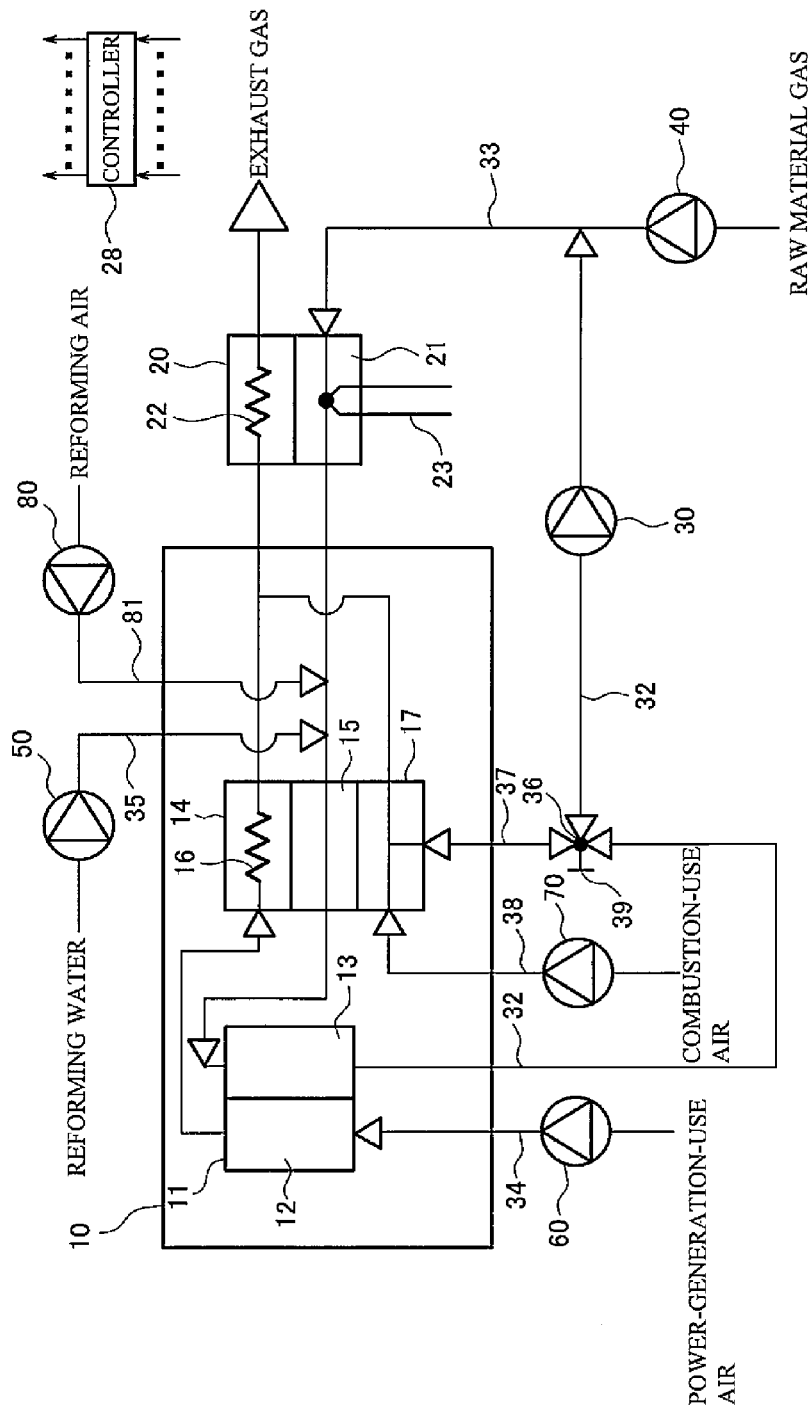
FIG. 2 is a schematic diagram showing one example of a schematic configuration of a fuel cell system according to Variation 1 of Embodiment 1 of the present invention.

Specifically, as shown in FIG. 2, the fuel cell system according to Variation 1 is configured such that the fuel cell system according to Embodiment 1 further includes: a reforming air passage 81 through which the reforming air supplied to the reformer 14 flows; and an OSR air booster pump (an air supplying unit) 80 configured to increase the pressure of the reforming air flowing through the reforming air passage 81, mix the reforming air with the raw material gas and the reforming water, and feed the mixture to the reformer 14. The reformer 14 generates a reformed gas by OSR reforming utilizing the mixture of the desulfurized raw material gas, the reforming water, and the reforming air.

It should be noted that FIG. 2 is a schematic diagram showing one example of a schematic configuration of the fuel cell system according to Variation 1 of Embodiment 1 of the present invention.

As described above, the configuration of the fuel cell system according to Variation 1 of Embodiment 1 is different from the above-described configuration of the fuel cell system according to Embodiment 1, in that the reformer 14 of the fuel cell system according to Variation 1 adopts a different reforming method, and the fuel cell system according to Variation 1 additionally includes the reforming air passage 81 and the OSR air booster pump 80.

The above-described fuel cell system according to Embodiment 1 is configured such that the controller 28 controls the distributor 39 to adjust the distribution of the anode off gas supplied to the combustor 17 and the anode off gas supplied to the hydrodesulfurizer 20 (i.e., adjust the distribution ratio), thereby adjusting the temperature of the exhaust gas discharged from the hot module 10.

Also in this respect, there are differences between the fuel cell system according to Variation 1 of Embodiment 1 and the above-described fuel cell system according to Embodiment 1. The differences are as follows: in the fuel cell system according to Variation 1 of Embodiment 1, the distributor 39 distributes the anode off gas to the combustor 17 and the hydrodesulfurizer 20 at a fixed distribution ratio; and in addition, the controller 28 controls the OSR air booster pump 80 to adjust the flow rate of the reforming air to supply, thereby adjusting the temperature of the exhaust gas discharged from the hot module 10.

Hereinafter, the configuration of the fuel cell system according to Variation 1 of Embodiment 1 is described in more detail. First, OSR reforming performed in the fuel cell system according to Variation 1 of Embodiment 1 is described.

OSR reforming is an intermediate reforming method between steam reforming involving an endothermic reaction and partial oxidation reforming involving an exothermic reaction. Among various types of OSR reforming, in particular, a completely thermally neutral type is called ATR (autothermal) reforming OSR reforming is applicable to, for example, the following cases: a case where faster start-up than in the case of performing steam reforming is required; and a case where reforming energy consumed in steam reforming after the composition of the supplied raw material gas has changed is so large that the adjustment of the combustion amount of the combustor 17 alone is not sufficient to adjust the temperature of the exhaust gas discharged from the hot module 10.

Specifically, if the amount of reforming air to be mixed with the desulfurized raw material gas and the reforming water increases, then the amount of raw material gas subjected to partial oxidation reforming increases whereas the amount of raw material gas subjected to steam reforming decreases. Accordingly, reforming energy consumed by the reformer 14 decreases. Therefore, the thermal energy of the exhaust gas discharged from the hot module 10 increases.

Conversely, if the amount of reforming air to be mixed with the desulfurized raw material gas and the reforming water decreases, then the amount of raw material gas subjected to steam reforming increases whereas the amount of raw material gas subjected to partial oxidation reforming decreases. Accordingly, reforming energy consumed by the reformer 14 increases. Therefore, the thermal energy of the exhaust gas discharged from the hot module 10 decreases.

As described above, in the fuel cell system according to Variation 1, the temperature of the exhaust gas discharged from the hot module 10 can be adjusted by changing the amount of air supplied through the reforming air passage 81. Therefore, in the fuel cell system according to Variation 1, the controller 28 controls the OSR air booster pump 80 based on a result of the temperature detection by the hydrodesulfurization temperature detector 23, thereby adjusting the flow rate of the reforming air to supply. In this manner, the temperature of the hydrodesulfurizer 20 can be adjusted to be within the optimal temperature range.

As described above, the temperature of the exhaust gas can be adjusted also by changing the flow rate of the reforming air to supply. Therefore, in the fuel cell system according to Variation 1, the temperature of the hydrodesulfurizer 20 can be adjusted to be within the optimal temperature range.

The configuration of the fuel cell system according to Embodiment 1 may be combined with the configuration of the fuel cell system according to Variation 1 of Embodiment 1. Specifically, in the configuration of the fuel cell system according to Variation 1 shown in FIG. 2, the controller 28 may control the distributor 39 to adjust the distribution of the anode off gas supplied to the combustor 17 and the anode off gas supplied to the hydrodesulfurizer 20 (i.e., adjust the distribution ratio), and the controller 28 may also control the OSR air booster pump 80 to adjust the flow rate of the reforming air to supply. In this manner, an alternative configuration may be adopted, in which the distribution ratio of the anode off gas and the flow rate of the reforming air are adjusted, and thereby the temperature of the exhaust gas discharged from the hot module 10 is adjusted.

In the case of adopting this alternative configuration, the fuel cell system can adjust the temperature of the hydrodesulfurizer 20 to be within the optimal temperature range more precisely.

(Variation 2)

Figure 3:
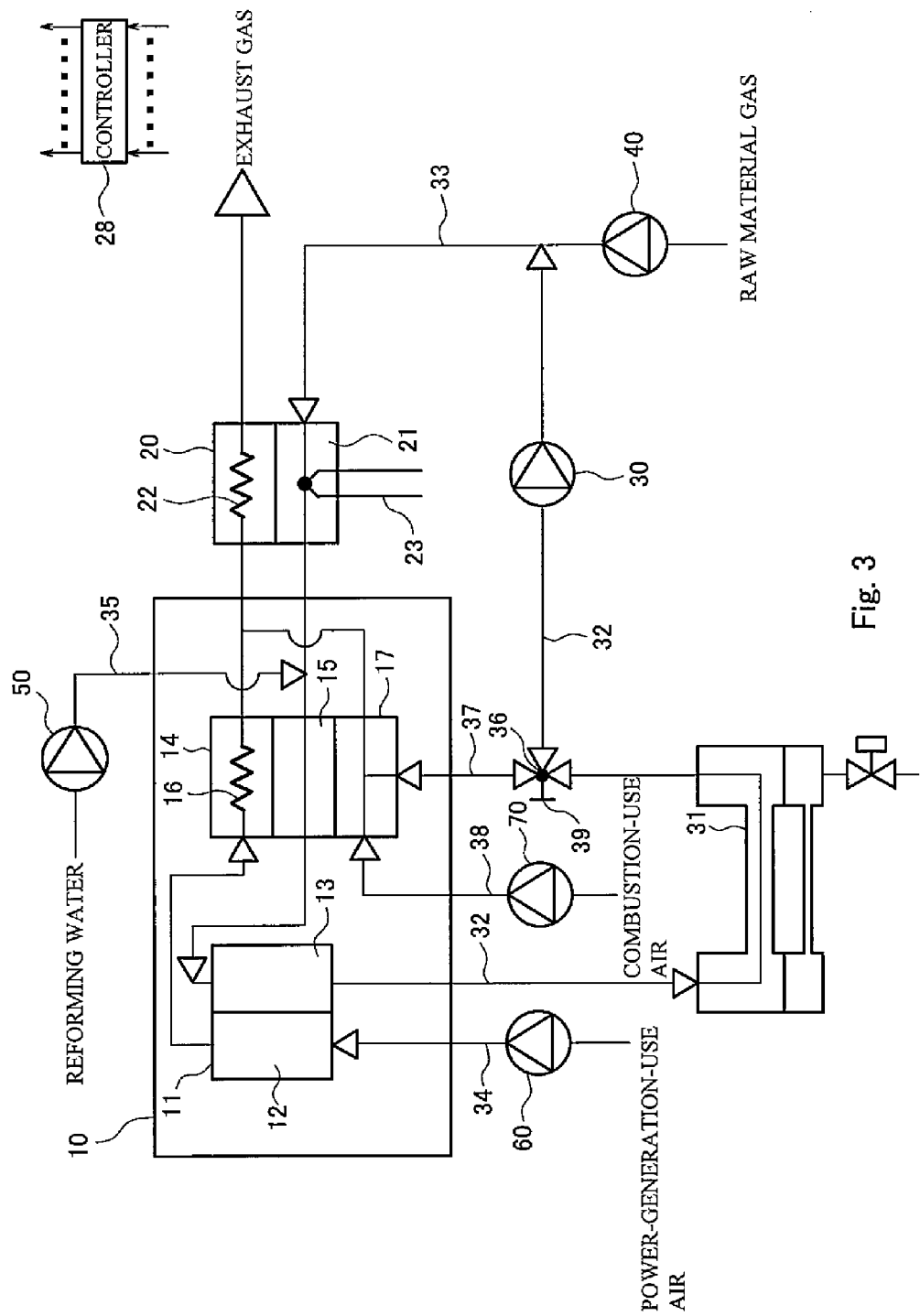
FIG. 3 is a schematic diagram showing one example of a schematic configuration of a fuel cell system according to Variation 2 of Embodiment 1 of the present invention.

As Variation 2 of the fuel cell system according to Embodiment 1, a fuel cell system with the following configuration can be proposed. The fuel cell system according to Variation 2 is configured such that the fuel cell system according to Embodiment 1 further includes a gas-liquid separator 31 on the recycle passage 32 as shown in FIG. 3. FIG. 3 is a schematic diagram showing one example of a schematic configuration of the fuel cell system according to Variation 2 of Embodiment 1 of the present invention.

In the fuel cell system according to Variation 2, the gas-liquid separator 31 is provided on the recycle passage 32 between the hot module 10 and the branch point 36. It should be noted that, except for the inclusion of the gas-liquid separator 31, the configuration of the fuel cell system according to Variation 2 is the same as the above-described configuration of the fuel cell system according to Embodiment 1. Therefore, the description of the other components is omitted.

Specifically, as shown in FIG. 3, the fuel gas (reformed gas) supplied to the anode 13 is discharged to the recycle passage 32 as the anode off gas containing hydrogen that has not been utilized in the power-generating reaction of the SOFC 11. Then, the anode off gas is guided to the gas-liquid separator 31 through the recycle passage 32, and condensed by the gas-liquid separator 31.

The anode off gas guided to the gas-liquid separator 31 exchanges heat with the atmosphere, so that the anode off gas is cooled down and condensed. Then, the anode off gas from which most of the steam contained therein has been eliminated is discharged from the gas-liquid separator 31.

The anode off gas discharged from the gas-liquid separator 31 branches at the branch point 36, such that part of the anode off gas is fed to the combustor 17 through the combustion-use gas passage 37. The pressure of the remaining anode off gas is increased by the hydrogenation booster pump 30, and the anode off gas whose pressure has been increased is guided to the raw material gas passage 33 through the recycle passage 32.

As described above, the fuel cell system according to Variation 2 includes the gas-liquid separator 31 provided on the recycle passage 32. This configuration makes it possible to prevent a reduction reaction catalyzed by the desulfurization catalyst 21 from being hindered by the steam contained in the anode off gas.

Moreover, the combustion of the anode off gas fed to the combustor 17 through the combustion-use gas passage 37 can be prevented from becoming unstable since the steam contained in the anode off gas is removed by the gas-liquid separator 31.

Furthermore, failure, water blockage, or the like due to steam can be prevented from occurring in the distributor 39 since the steam contained in the anode off gas is removed by the gas-liquid separator 31. This makes it possible to improve the operational reliability of the fuel cell system.
(Variation 3)

Figure 4:
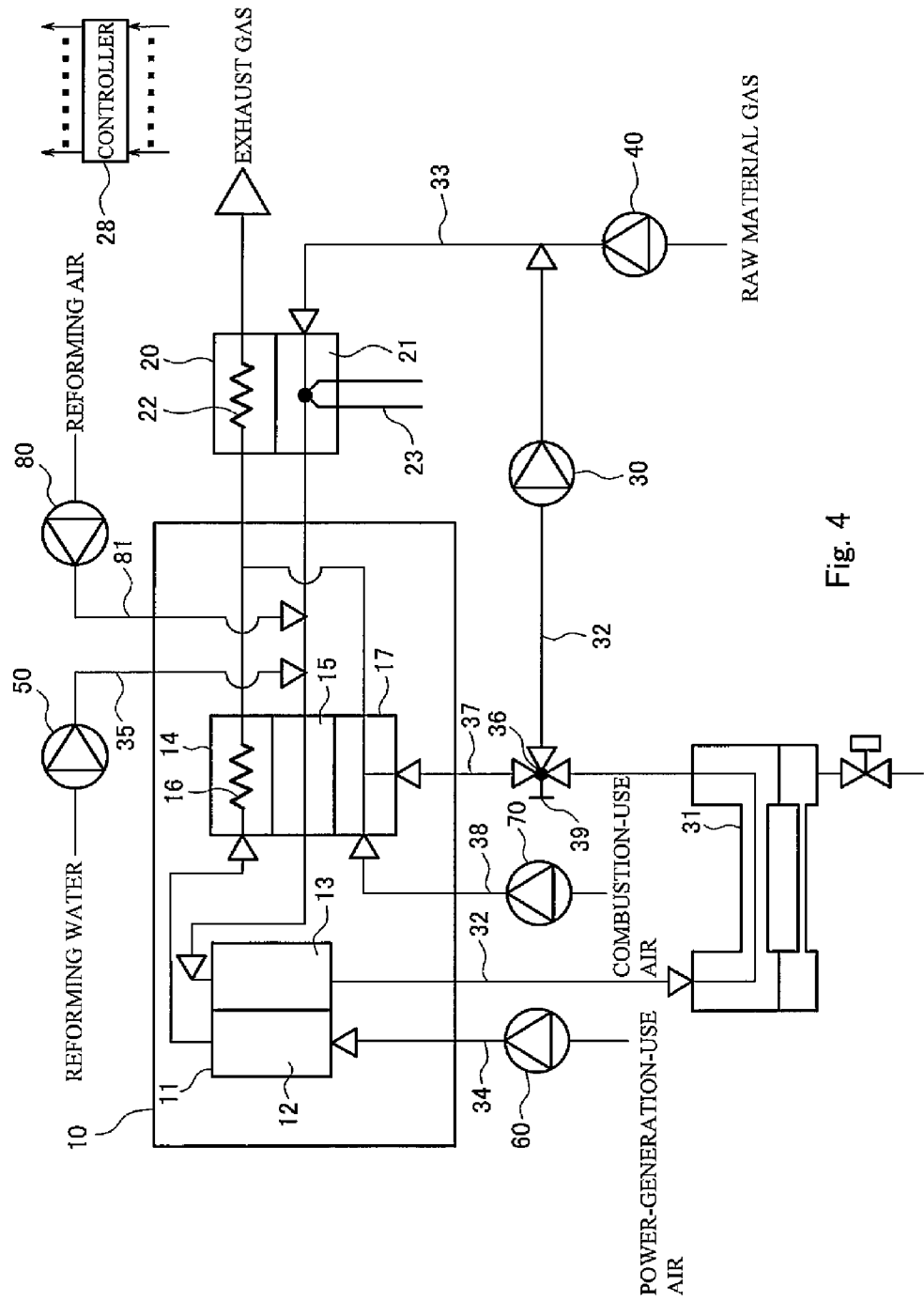
FIG. 4 is a schematic diagram showing one example of a schematic configuration of a fuel cell system according to Variation 3 of Embodiment 1 of the present invention.

As another variation, the above-described fuel cell system according to Variation 1 of Embodiment 1 may further include the gas-liquid separator 31 on the recycle passage 32 between the hot module 10 and the branch point 36 as shown in FIG. 4. FIG. 4 is a schematic diagram showing one example of a schematic configuration of a fuel cell system according to Variation 3 of Embodiment 1 of the present invention.

It should be noted that, except for the inclusion of the gas-liquid separator 31, the configuration of the fuel cell system according to Variation 3 is the same as the above-described configuration of the fuel cell system according to Variation 1 of Embodiment 1. Therefore, the description of the other components is omitted.

As shown in FIG. 4, the fuel cell system according to Variation 3 includes the gas-liquid separator 31 provided on the recycle passage 32. Accordingly, similar to Variation 2, steam contained in the anode off gas can be removed. This makes it possible to prevent a reduction reaction catalyzed by the desulfurization catalyst 21 from being hindered by the steam. Moreover, the combustion of the anode off gas fed to the combustor 17 through the combustion-use gas passage 37 can be prevented from becoming unstable. Furthermore, failure, water blockage, or the like due to steam can be prevented from occurring in the distributor 39. This makes it possible to improve the operational reliability of the fuel cell system.
(Variations 4 and 5)

Figure 5:
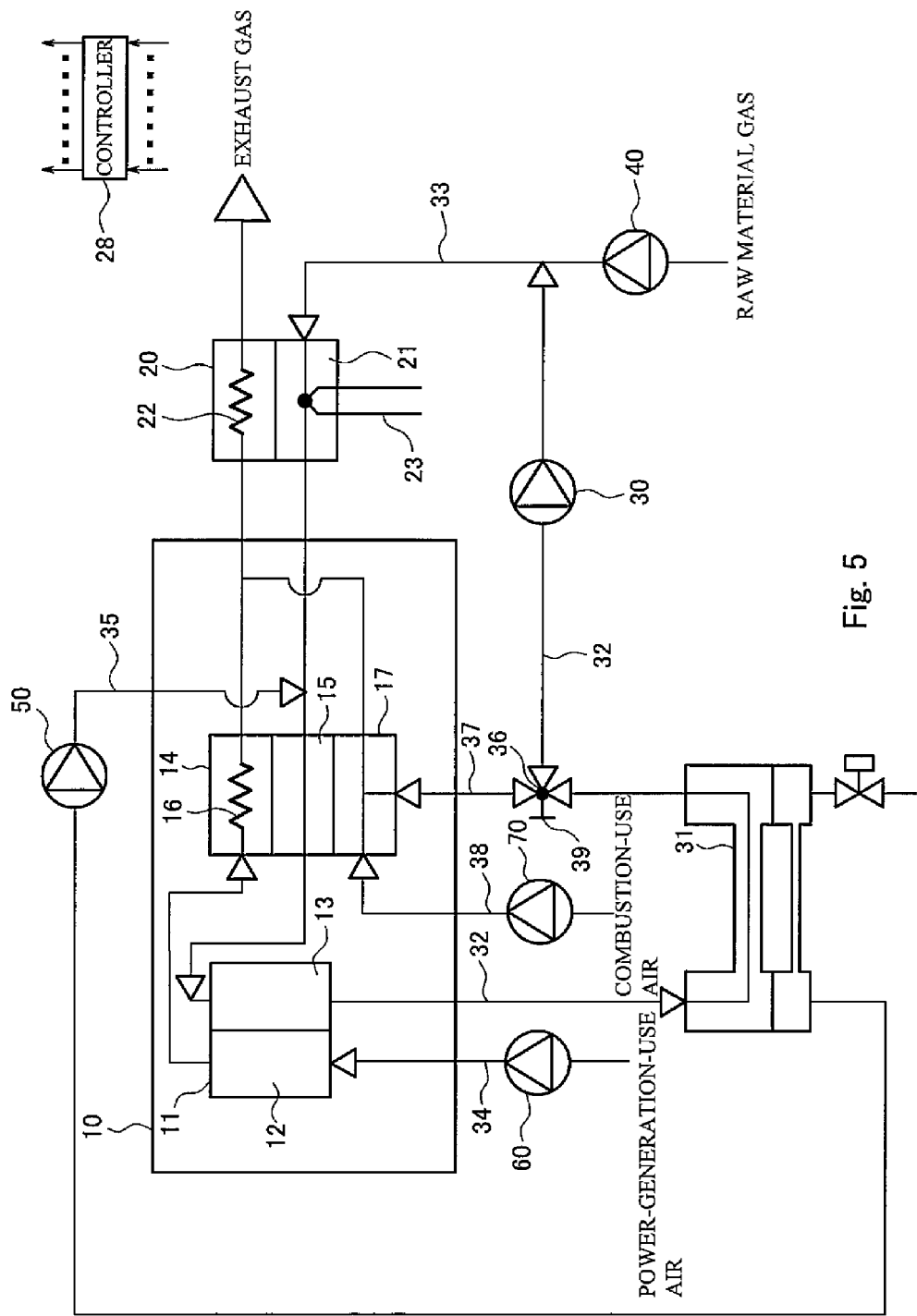
FIG. 5 is a schematic diagram showing one example of a schematic configuration of a fuel cell system according to Variation 4 of Embodiment 1 of the present invention.

As shown in FIG. 5, a fuel cell system according to Variation 4 may be configured as described below. FIG. 5 is a schematic diagram showing one example of a schematic configuration of the fuel cell system according to Variation 4 of Embodiment 1 of the present invention.

Specifically, the fuel cell system according to Variation 4 is configured such that, in the above-described fuel cell system according to Variation 2, condensation water separated from the anode off gas by the gas-liquid separator 31 is supplied as reforming water to be utilized in the reformer 14. That is, as shown in FIG. 5, the upstream end of the reforming water passage 35 is connected to the gas-liquid separator 31. The pressure of the condensation water generated in the gas-liquid separator 31 is increased by the reforming water pump 50, and the condensation water whose pressure has been increased is supplied into the hot module 10 as reforming water. It should be noted that, except for the configuration for utilizing the condensation water generated in the gas-liquid separator 31 as reforming water, the fuel cell system according to Variation 4 is the same as the fuel cell system according to Variation 2. Therefore, the description of the other components is omitted.

Figure 6:
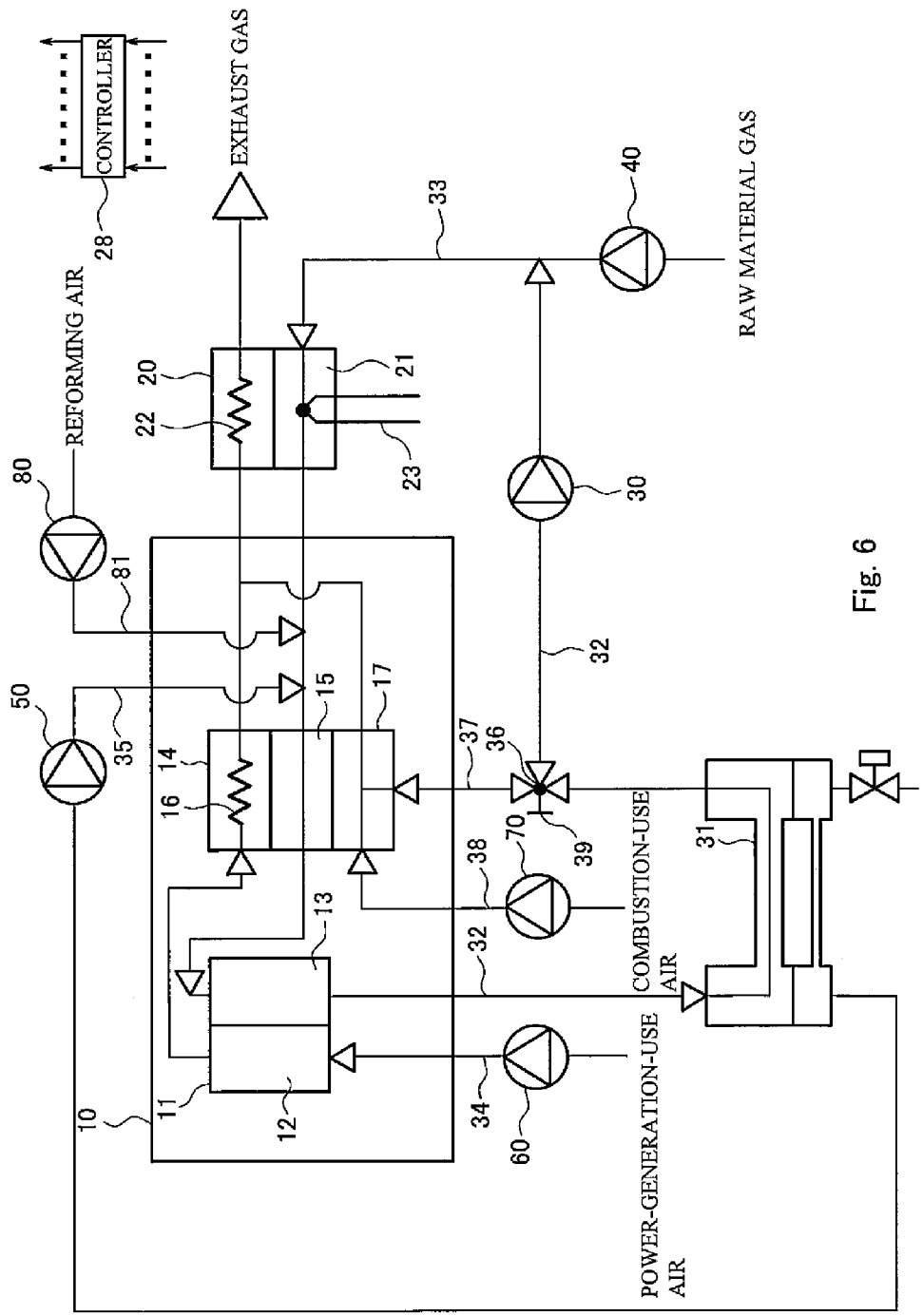
FIG. 6 is a schematic diagram showing one example of a schematic configuration of a fuel cell system according to Variation 5 of Embodiment 1 of the present invention.

As shown in FIG. 6, a fuel cell system according to Variation 5 may be configured as described below. FIG. 6 is a schematic diagram showing one example of a schematic configuration of the fuel cell system according to Variation 5 of Embodiment 1 of the present invention.

Specifically, the fuel cell system according to Variation 5 is configured such that, in the above-described fuel cell system according to Variation 3, condensation water separated from the anode off gas by the gas-liquid separator 31 is supplied as reforming water to be utilized in the reformer 14. That is, as shown in FIG. 6, the upstream end of the reforming water passage 35 is connected to the gas-liquid separator 31. The pressure of the condensation water generated in the gas-liquid separator 31 is increased by the reforming water pump 50, and the condensation water whose pressure has been increased is supplied into the hot module 10 as reforming water. It should be noted that, except for the configuration for utilizing the condensation water generated in the gas-liquid separator 31 as reforming water, the fuel cell system according to Variation 5 is the same as the fuel cell system according to Variation 3. Therefore, the description of the other components is omitted.

Unlike PEFC or PAFC, water is generated at the anode 13 side in the SOFC 11 owing to a cell reaction. Accordingly, the anode off gas discharged from the SOFC 11 has a very high partial vapor pressure (about 80° C. in terms of a dew point). Condensation water that can be utilized as reforming water can be readily obtained by lowering the temperature of the anode off gas to about 50° C. to condense the anode off gas.

Thus, in the fuel cell systems according to Variations 4 and 5, condensation water obtained from the anode off gas flowing through the recycle passage 32 can be utilized as reforming water to be supplied to the reformer 14. This allows the fuel cell systems according to Variations 4 and 5 to be widely applicable as a power supply installed at a location when there is no water infrastructure or the like, such as a portable power supply or an in-vehicle APU (Auxiliary Power Unit), for example.

Embodiment 2

Figure 7:
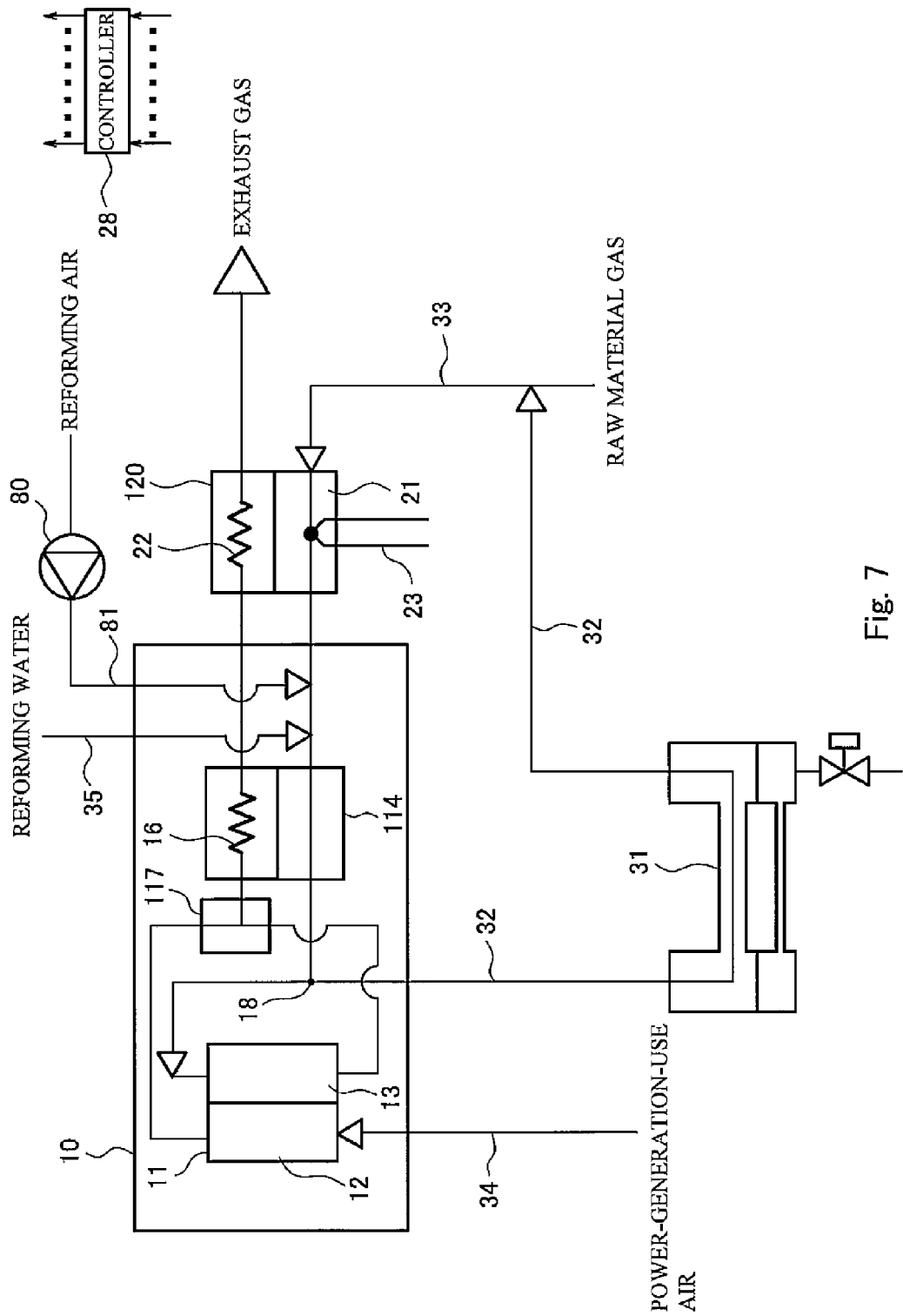
FIG. 7 is a schematic diagram showing one example of a schematic configuration of a fuel cell system according to Embodiment 2 of the present invention.

Next, a fuel cell system according to Embodiment 2 of the present invention is described with reference to FIG. 7. FIG. 7 is a schematic diagram showing one example of a schematic configuration of the fuel cell system according to Embodiment 2 of the present invention.

As shown in FIG. 7, the fuel cell system according to Embodiment 2 is configured such that the fuel cell system according to the above-described comparative example further includes the reforming air passage 81, the OSR air booster pump 80 (the air supplying unit), and the hydrodesulfurization temperature detector 23, and the reformer 114 performs OSR reforming. Therefore, the description of the components that are the same as those of the fuel cell system according to the above-described comparative example is omitted.

That is, unlike Embodiment 1, the fuel cell system according to Embodiment 2 is configured such that not the anode off gas but part of the reformed gas generated by the reformer 114 flows through the recycle passage 32. Another difference from Embodiment 1 is that the configuration of the fuel cell system according to Embodiment 2 is not one that includes the combustion-use gas passage 37 branching off from the recycle passage 32 at the branch point 36, but one where the recycle passage 32 directly connects to the raw material gas passage 33.

In such a configuration, if a result of the detection by the hydrodesulfurization temperature detector 23 indicates that the temperature of the desulfurization catalyst 21 of the hydrodesulfurizer 120 (the desulfurizer) is higher than the optimal temperature range, then the controller 28 controls the operating amount of the OSR air booster pump 80 to decrease the flow rate of the reforming air to supply. As a result, reforming energy consumed by the reformer 114 increases. Accordingly, as described above, the temperature of the exhaust gas discharged from the hot module 10 can be decreased. This makes it possible to adjust the temperature of the desulfurization catalyst 21 of the hydrodesulfurizer 120 to be within the optimal temperature range.

On the other hand, if a result of the detection by the hydrodesulfurization temperature detector 23 indicates that the temperature of the desulfurization catalyst 21 is lower than the optimal temperature range, then the controller 28 controls the operating amount of the OSR air booster pump 80 to increase the flow rate of the reforming air to supply. As a result, reforming energy consumed by the reformer 114 decreases. Accordingly, as described above, the temperature of the exhaust gas discharged from the hot module 10 can be increased. This makes it possible to adjust the temperature of the desulfurization catalyst of the hydrodesulfurizer 120 to be within the optimal temperature range.

The fuel cell system according to Embodiment 2 is configured such that, as shown in FIG. 7, the gas-liquid separator 31 condenses part of the reformed gas, which is to be supplied to the hydrodesulfurizer 120, and the reformed gas from which the moisture contained therein has been thus removed is supplied to the hydrodesulfurizer 120.

Therefore, for example, in a case when a booster pump or the like is provided on a flow passage of the reformed gas, problems caused by moisture such as failure or water blockage in the booster pump can be prevented from occurring. Moreover, a reduction reaction catalyzed by the desulfurization catalyst 21 can be prevented from being hindered by the steam contained in the reformed gas.

The example in FIG. 7 shows a configuration when the moisture removed by the gas-liquid separator 31 (i.e., condensation water) is drained out. However, as an alternative configuration, the condensation water may be utilized as reforming water to be supplied to the reformer 114.

It should be noted that the above-described fuel cell systems according to Embodiment 1, Variations 1 to 5 of Embodiment 1, and Embodiment 2 are configured to adjust the distribution ratio of the anode off gas and adjust the flow rate of the reforming air in accordance with whether or not the temperature of the desulfurization catalyst 21 is within the optimal temperature range. However, the configurations of the fuel cell systems are not thus limited. Alternatively, the fuel cell systems may be configured to: determine the composition of the supplied raw material gas; and adjust the distribution ratio of the anode off gas and adjust the flow rate of the reforming air based on a result of the determination. In addition, the fuel cell systems may be configured such that if the composition of the supplied raw material gas changes to become heavy, causing a decrease in reforming energy and causing the temperature of the hydrodesulfurizer 20 or 120 to increase to exceed the optimal temperature range, then the controller performs control, for example, to decrease the amount of anode off gas, thereby decreasing the amount of combustion. Further alternatively, a configuration may be adopted, in which the controller performs control to decrease the amount of reforming air such that the reforming energy consumed by the reformer increases.

It should be noted that, for example, a configuration as described below may be applicable as a configuration for determining the composition of the raw material gas. Specifically, the above-described fuel cell systems may further include: a reformer temperature detector configured to detect the temperature of the reformer 14 or 114; and a storage unit storing table data indicating a correspondence relationship between a temperature increase value per unit time and the composition of the raw material. Based on the temperature increase value per unit time, which is detected by the reformer temperature detector, the controller 28 refers to the table data stored in the storage unit to determine the composition of the raw material gas.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The fuel cell system technology according to the present invention makes it possible to improve the long-term reliability of a fuel cell system installed in an area when the composition of a raw material gas supplied via a grid is not constant and the raw material gas contains a relatively wide variety of and a large amount of sulfur. The fuel cell system according to the present invention is advantageously applicable not only in such an area but also in a case where, for example, a mixed gas is supplied from a gas cylinder. To be specific, in the case where a mixed gas is supplied from a gas cylinder, different types of fuels are sequentially supplied in the order of volatility from the most volatile one to the least volatile one. Therefore, the composition of the gas changes over time from the beginning of the use of the gas to the end of the use of the gas. Even in such a case, the fuel cell system according to the present invention is applicable.

REFERENCE SIGNS LIST 10 hot module (casing part)
11 SOFC (fuel cell)
12 cathode
13 anode
14 reformer
15 reforming catalyst
16 reformer heat receiver
17 combustor
20 hydrodesulfurizer (desulfurizer)
21 desulfurization catalyst
22 hydrodesulfurizer heat receiver
23 hydrodesulfurizer temperature detector (temperature detector)
28 controller
30 hydrogenation booster pump 31 gas-liquid separator
32 recycle passage
33 raw material gas passage
34 air passage
35 reforming water passage
36 branch point
37 combustion-use gas passage
38 combustion-use air passage
39 distributor
40 raw material booster pump
50 reforming water pump
60 cathode air booster pump
70 combustion air booster pump
80 OSR air booster pump (air supplying unit)
81 reforming air passage
114 reformer
120 hydrodesulfurizer (desulfurizer)

The invention claimed is:

1. A fuel cell system comprising:
a reformer configured to generate a reformed gas from a raw material gas, water, and air that are supplied to the reformer, the reformed gas serving as a fuel gas;
a fuel cell configured to generate electric power through a power-generating reaction by utilizing the fuel gas and air;
a combustor configured to combust an anode off gas, the anode off gas being the fuel gas that has not been utilized in the fuel cell;
a casing part housing at least the reformer, the fuel cell, and the combustor, which are covered with a heat insulating material;
a desulfurizer configured to remove a sulfur component from the raw material gas supplied thereto by hydrodesulfurization;
a distributor configured to distribute the anode off gas to the combustor and the desulfurizer while adjusting an amount of the anode off gas supplied to the combustor and an amount of the anode off gas supplied to the desulfurizer;
an air supplying unit configured to adjust a flow rate of the air supplied to the reformer;
a temperature detector configured to detect a temperature of a desulfurization catalyst packed in the desulfurizer; and
a controller configured to control the flow rate of the air supplied by the air supplying unit and a distribution ratio of the anode off gas distributed by the distributor based on a result of detection by the temperature detector,
wherein the anode off gas is supplied to the combustor and the desulfurizer in a distributed manner, and
the desulfurizer performs the hydrodesulfurization of the raw material gas by utilizing the supplied anode off gas as a hydrogen source and utilizing an exhaust gas discharged from the casing part as a heat source, the exhaust gas containing at least combustion gas from the combustor.

2. The fuel cell system according to claim 1, wherein
if the result of the detection by the temperature detector indicates that the temperature of the desulfurization catalyst is higher than an optimal temperature range, the optimal temperature range being defined as a temperature range that allows effective activity of the desulfurization catalyst, the controller controls the air supplying unit to decrease an amount of the air supplied to the reformer such that a proportion of the air to the fuel gas decreases, and
if the result of the detection by the temperature detector indicates that the temperature of the desulfurization catalyst is lower than the optimal temperature range, the controller controls the air supplying unit to increase the amount of the air supplied to the reformer such that the proportion of the air to the fuel gas increases.

3. The fuel cell system according to claim 1, wherein
if the result of the detection by the temperature detector indicates that the temperature of the desulfurization catalyst is higher than an optimal temperature range, the optimal temperature range being defined as a temperature range that allows effective activity of the desulfurization catalyst, the controller controls the air supplying unit to decrease an amount of the air supplied to the reformer such that a proportion of the air to the fuel gas decreases, and controls the distributor to decrease the amount of the anode off gas supplied to the combustor and increase the amount of the anode off gas supplied to the desulfurizer, and
if the result of the detection by the temperature detector indicates that the temperature of the desulfurization catalyst is lower than the optimal temperature range, the controller controls the air supplying unit to increase the amount of the air supplied to the reformer such that the proportion of the air to the fuel gas increases, and controls the distributor to increase the amount of the anode off gas supplied to the combustor and decrease the amount of the anode off gas supplied to the desulfurizer.

4. A fuel cell system comprising:
a reformer configured to generate a reformed gas from a raw material gas and water that are supplied to the reformer, the reformed gas serving as a fuel gas;
a fuel cell configured to generate electric power through a power-generating reaction by utilizing the fuel gas and air;
a combustor configured to combust an anode off gas, the anode off gas being the fuel gas that has not been utilized in the fuel cell;
a casing part housing at least the reformer, the fuel cell, and the combustor, which are covered with a heat insulating material;
a desulfurizer configured to remove a sulfur component from the raw material gas supplied thereto by hydrodesulfurization;
a distributor configured to distribute the anode off gas to the combustor and the desulfurizer while adjusting an amount of the anode off gas supplied to the combustor and an amount of the anode off gas supplied to the desulfurizer;
a temperature detector configured to detect a temperature of a desulfurization catalyst packed in the desulfurizer; and
a controller configured to control a distribution ratio of the anode off gas distributed by the distributor based on a result of detection by the temperature detector,
wherein the anode off gas is supplied to the combustor and the desulfurizer in a distributed manner, and
the desulfurizer performs the hydrodesulfurization of the raw material gas by utilizing the supplied anode off gas as a hydrogen source and utilizing an exhaust gas discharged from the casing part as a heat source, the exhaust gas containing at least combustion gas from the combustor.

5. The fuel cell system according to claim 4, wherein
if the result of the detection by the temperature detector indicates that the temperature of the desulfurization catalyst is higher than an optimal temperature range, the optimal temperature range being defined as a temperature range that allows effective activity of the desulfurization catalyst, the controller controls the distributor to decrease the amount of the anode off gas supplied to the combustor and increase the amount of the anode off gas supplied to the desulfurizer, and if the result of the detection by the temperature detector indicates that the temperature of the desulfurization catalyst is lower than the optimal temperature range, the controller controls the distributor to increase the amount of the anode off gas supplied to the combustor and decrease the amount of the anode off gas supplied to the desulfurizer.

\* \* \* \* \*